United States Patent
Chun

(10) Patent No.: US 11,943,732 B2
(45) Date of Patent: Mar. 26, 2024

(54) METHOD FOR ALLOWING REGISTRATION TO NETWORK IN WIRELESS COMMUNICATION SYSTEM, AND DEVICE THEREFOR

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 17/420,906

(22) PCT Filed: Jan. 6, 2020

(86) PCT No.: PCT/KR2020/000214
§ 371 (c)(1),
(2) Date: Jul. 6, 2021

(87) PCT Pub. No.: WO2020/141964
PCT Pub. Date: Jul. 9, 2020

(65) Prior Publication Data
US 2022/0070815 A1 Mar. 3, 2022

(30) Foreign Application Priority Data

Jan. 4, 2019 (KR) .......................... 10-2019-0001413
Apr. 1, 2019 (KR) .......................... 10-2019-0037743

(51) Int. Cl.
*H04W 60/04* (2009.01)
*H04W 4/90* (2018.01)
(Continued)

(52) U.S. Cl.
CPC ............. *H04W 60/04* (2013.01); *H04W 4/90* (2018.02); *H04W 8/02* (2013.01); *H04W 48/16* (2013.01); *H04W 48/18* (2013.01); *H04W 84/042* (2013.01)

(58) Field of Classification Search
CPC ......... H04W 60/04; H04W 4/90; H04W 8/02; H04W 48/16; H04W 48/18; H04W 84/042
See application file for complete search history.

(56) References Cited

U.S. PATENT DOCUMENTS

2015/0055447 A1 2/2015 Jamadagni et al.
2015/0056944 A1* 2/2015 Bhatiya ............. H04M 1/72421
455/566

(Continued)

FOREIGN PATENT DOCUMENTS

KR 10-2011-0067270 6/2011
KR 10-2015-0136805 12/2015

(Continued)

OTHER PUBLICATIONS

PCT International Search Report in International Appln. No. PCT/KR2020/000214, dated Apr. 24, 2020, 2 pages (with English translation).

*Primary Examiner* — Wayne H Cai
(74) *Attorney, Agent, or Firm* — Fish & Richardson P.C.

(57) ABSTRACT

A method for performing, by a user equipment (UE), a registration to a network in a wireless communication system is disclosed. More specifically, the UE performs a registration to a first public land mobile network (PLMN) via a first base station, receives a disaster related message indicating that a disaster roaming service is provided, checks whether the UE is provided with the disaster roaming service based on the disaster related message, selects a second PLMN providing the disaster roaming service when (Continued)

the UE is provided with the disaster roaming service as a result of the check, transmits a registration request message to the selected second PLMN based on the disaster related message, and receives, from the second PLMN, a response message to the registration request message.

6 Claims, 13 Drawing Sheets

(51) Int. Cl.
  *H04W 8/02*   (2009.01)
  *H04W 48/16*  (2009.01)
  *H04W 48/18*  (2009.01)
  *H04W 84/04*  (2009.01)

(56) References Cited

U.S. PATENT DOCUMENTS

| | | | |
|---|---|---|---|
| 2017/0006536 A1* | 1/2017 | Baek | H04W 12/06 |
| 2018/0014178 A1* | 1/2018 | Baek | H04W 8/20 |
| 2019/0045423 A1* | 2/2019 | Kumar | H04W 68/005 |
| 2021/0029776 A1* | 1/2021 | Tiwari | H04L 65/1073 |

FOREIGN PATENT DOCUMENTS

| | | |
|---|---|---|
| KR | 10-2017-0004764 | 1/2017 |
| KR | 10-2017-0064335 | 6/2017 |

* cited by examiner

[FIG. 1]
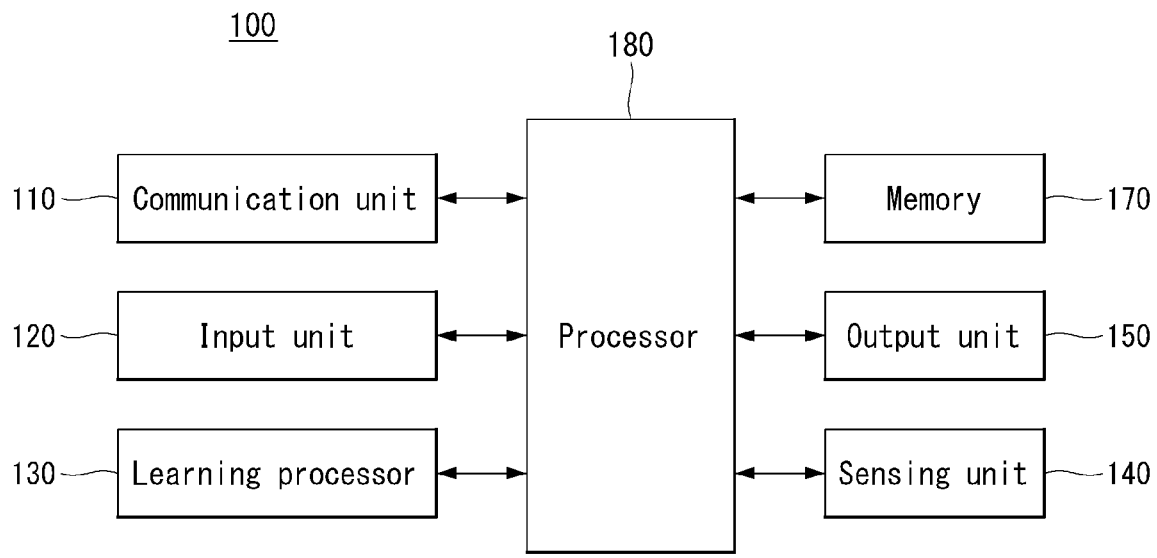
[FIG. 2]
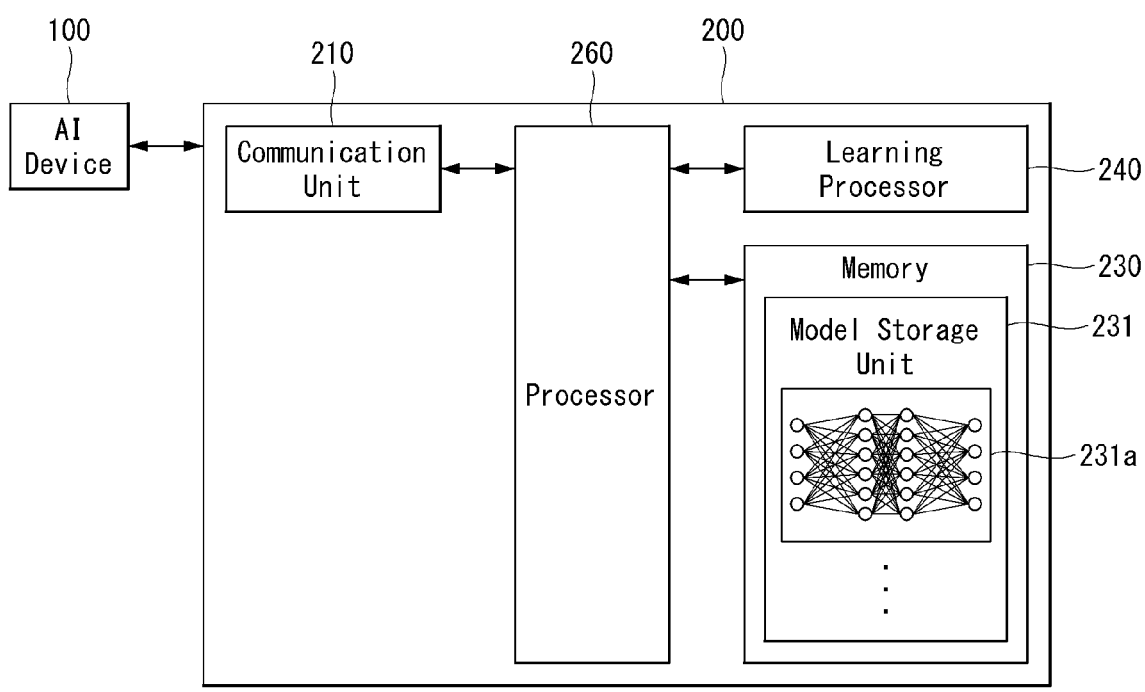

[FIG. 3]
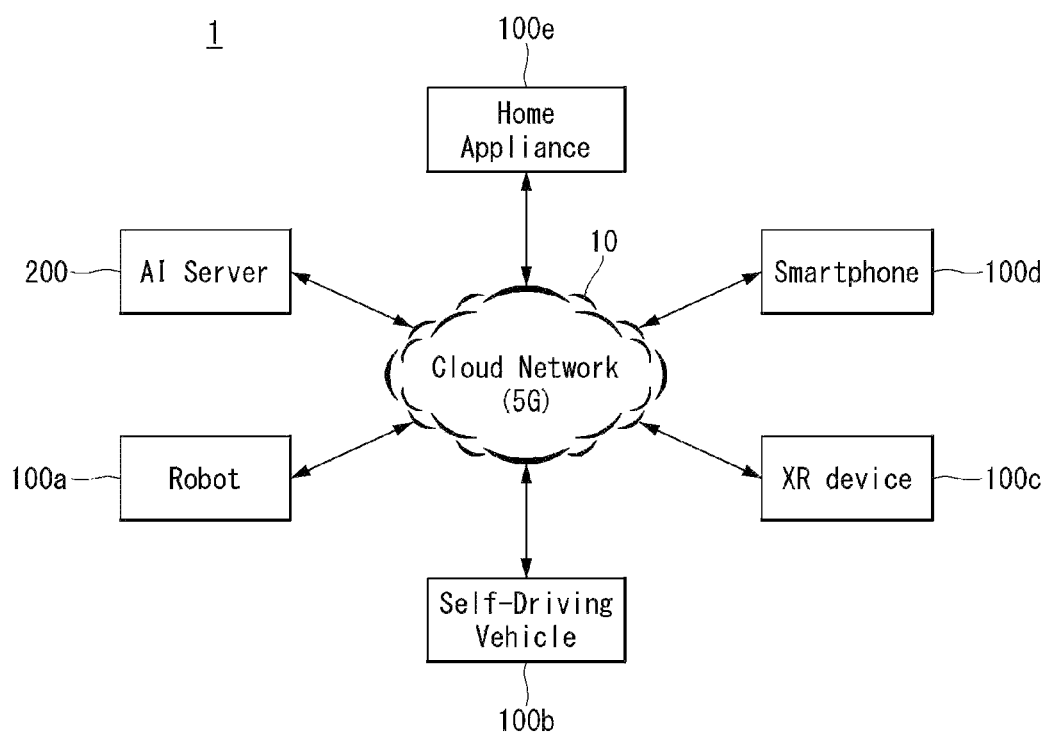

[ FIG. 4 ]
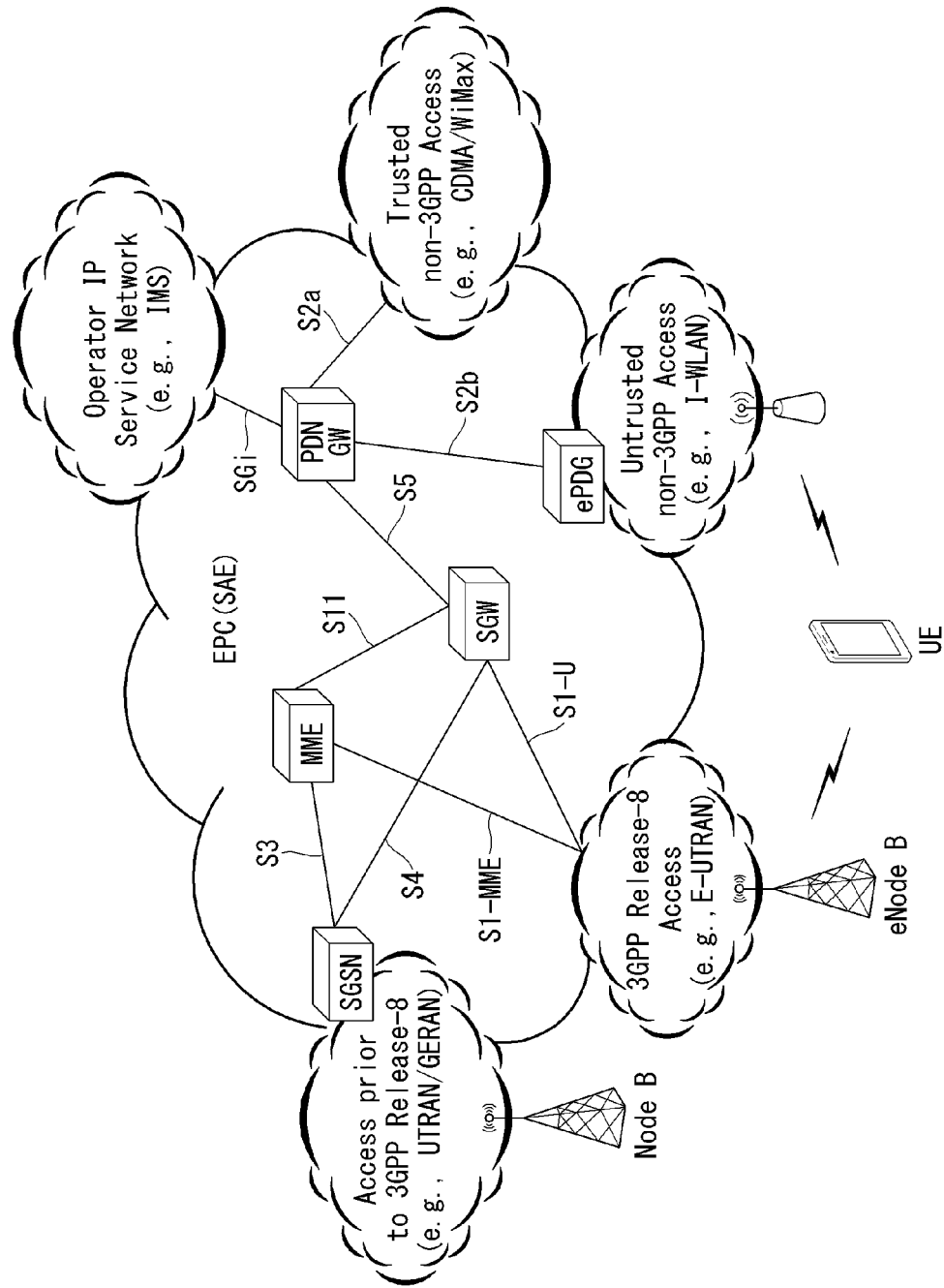

[FIG. 5]
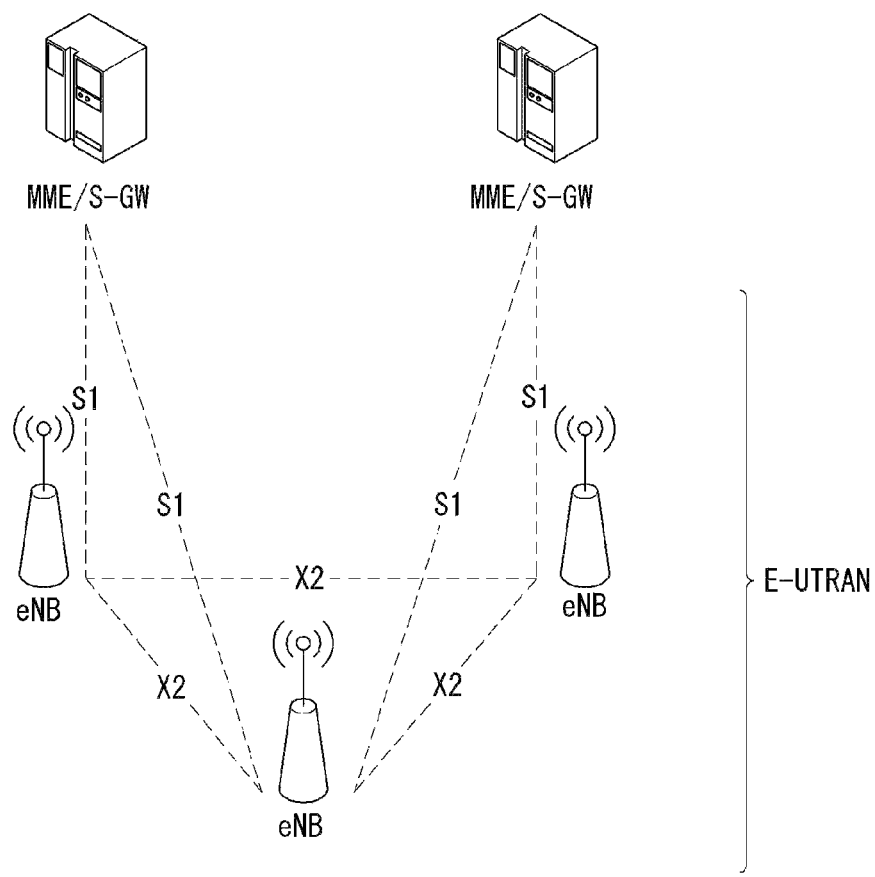

[FIG. 6]
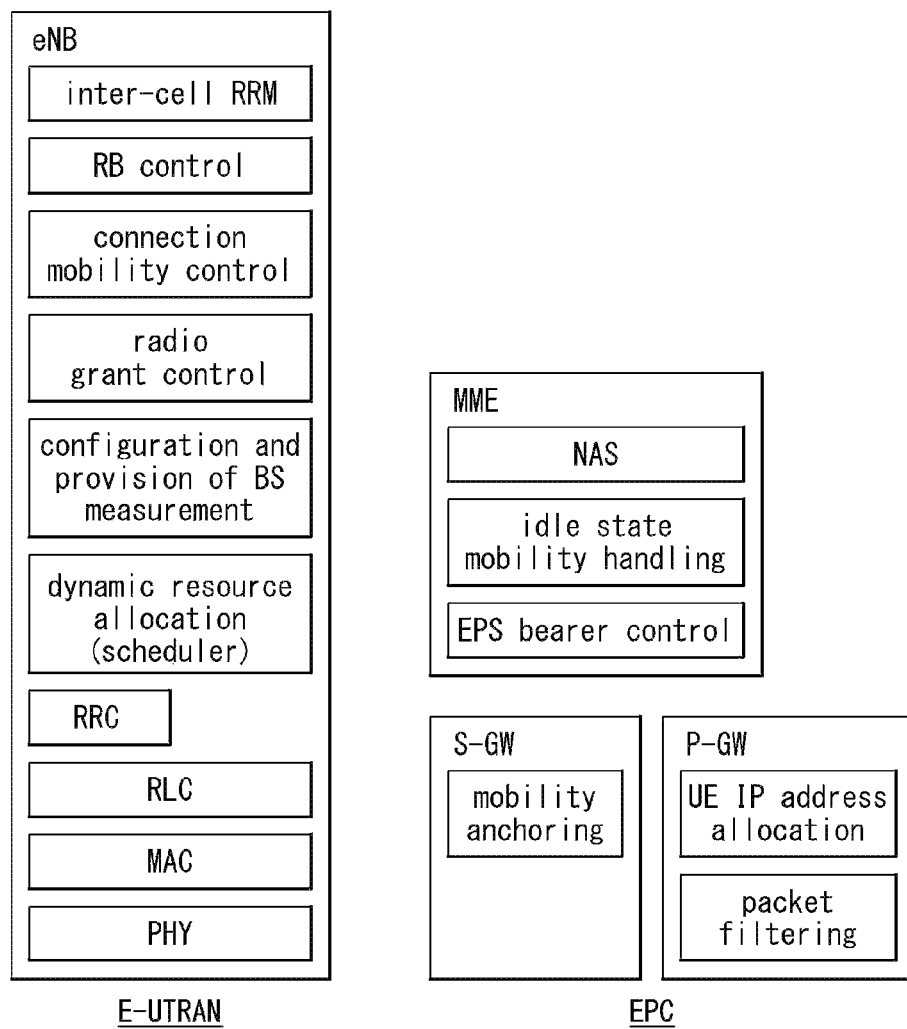

【FIG. 7】
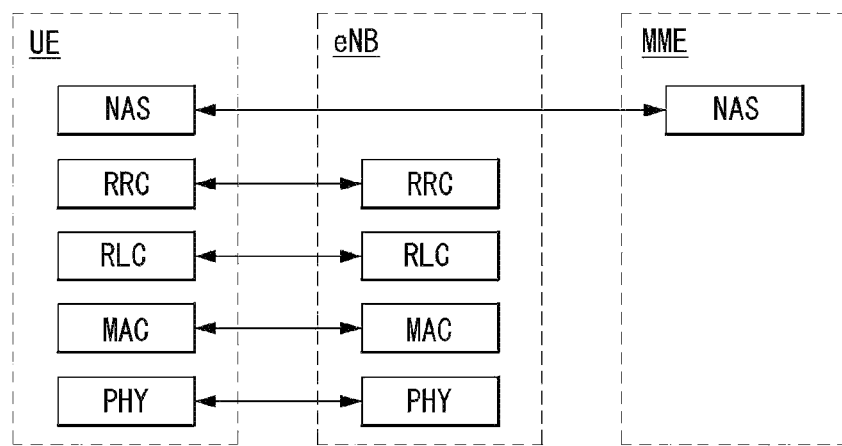
【FIG. 8】
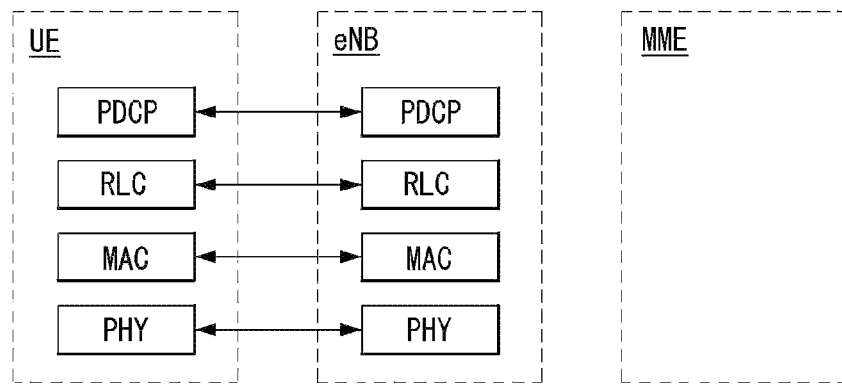

[FIG. 9]
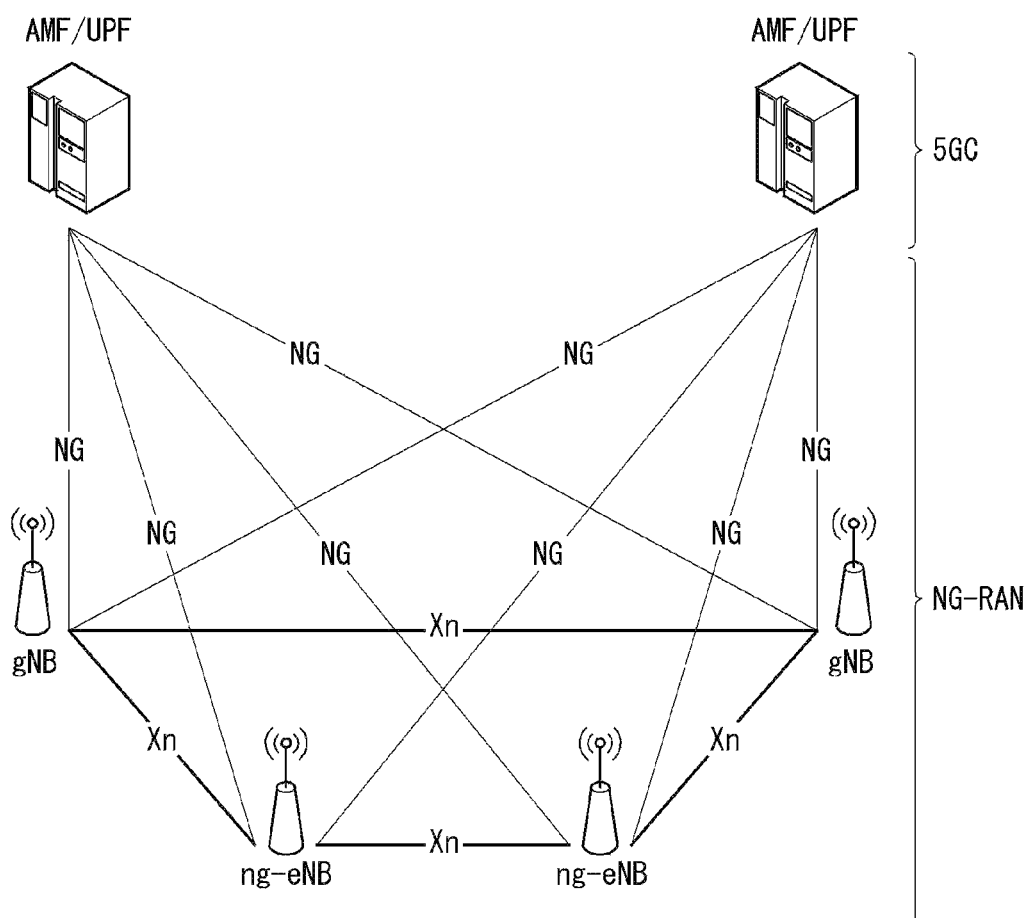

[FIG. 10]
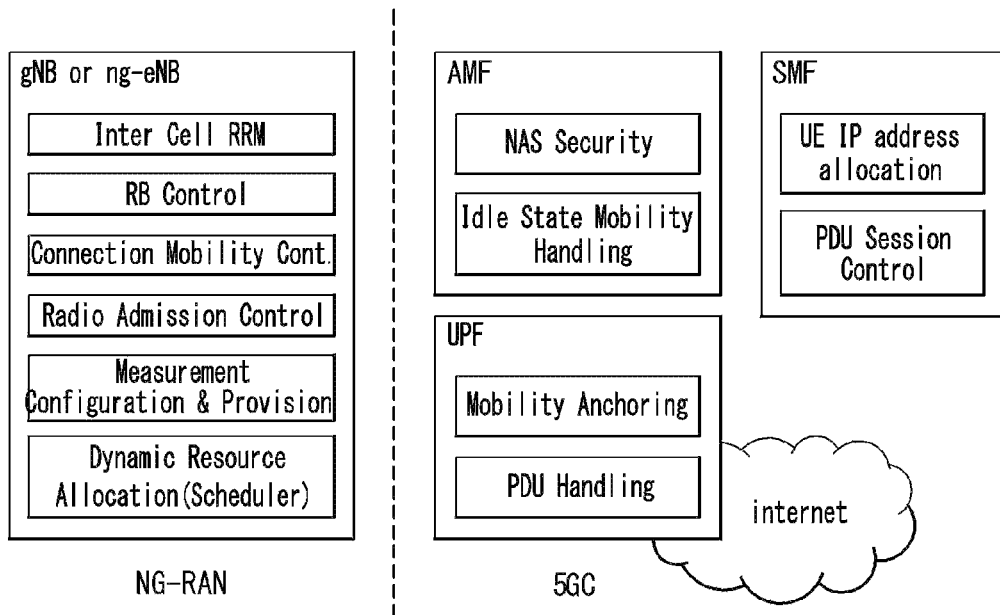
[FIG. 11]
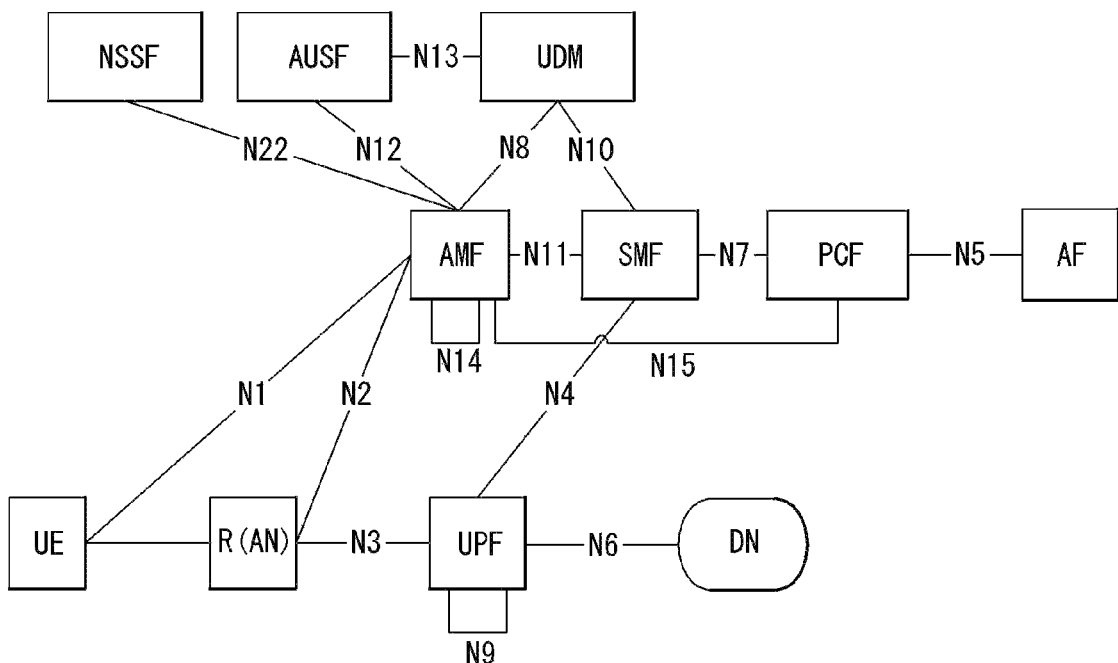

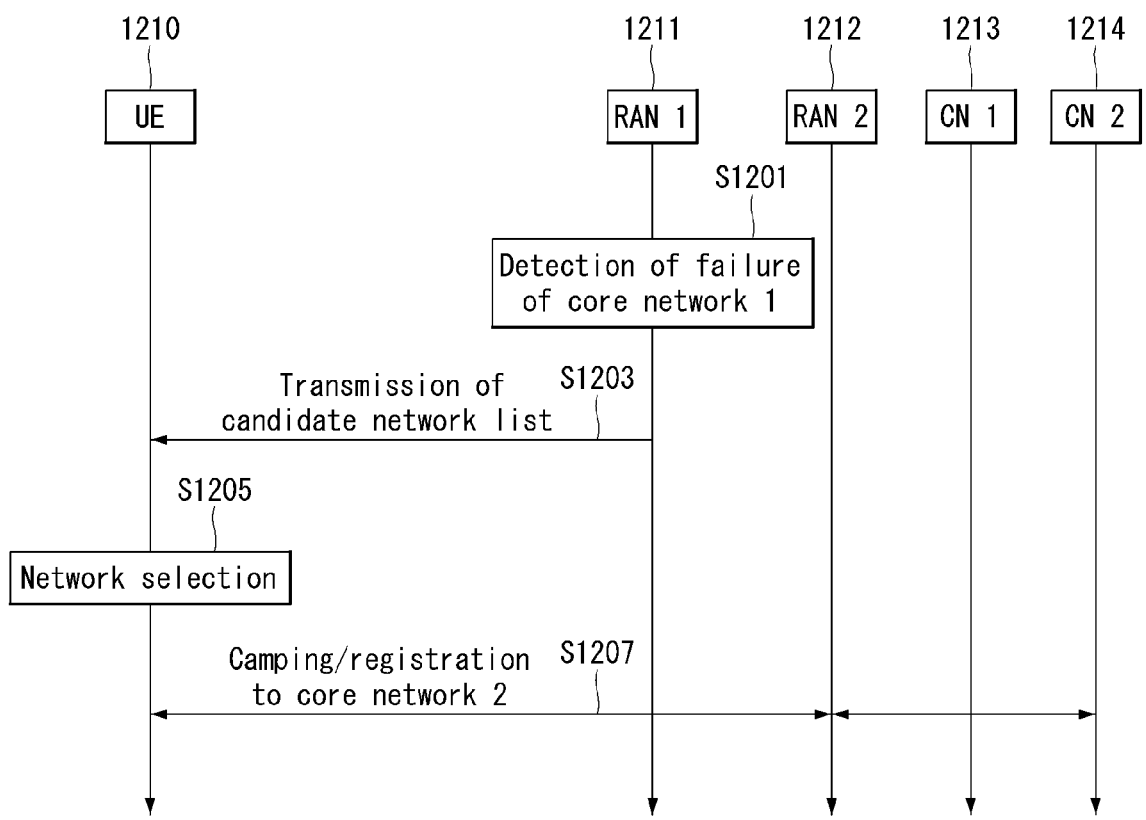
[FIG. 12]

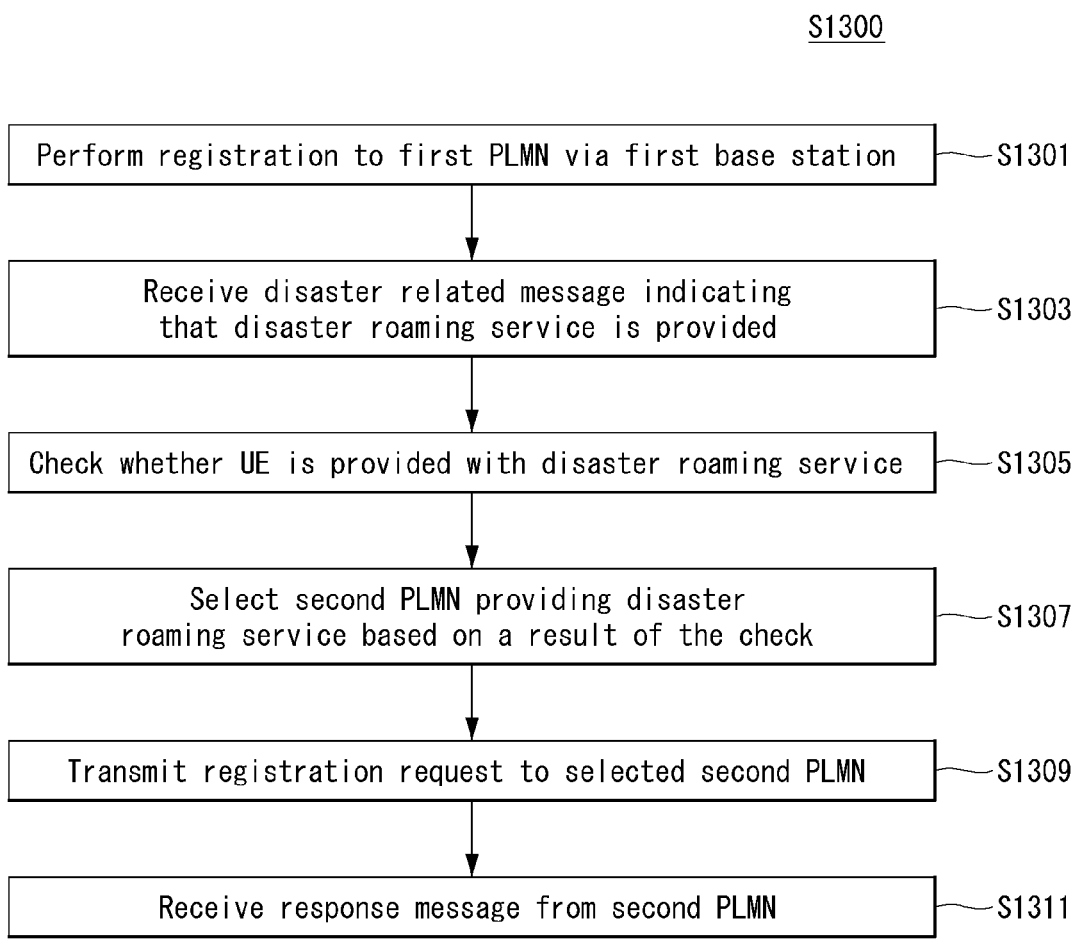

[FIG. 14]
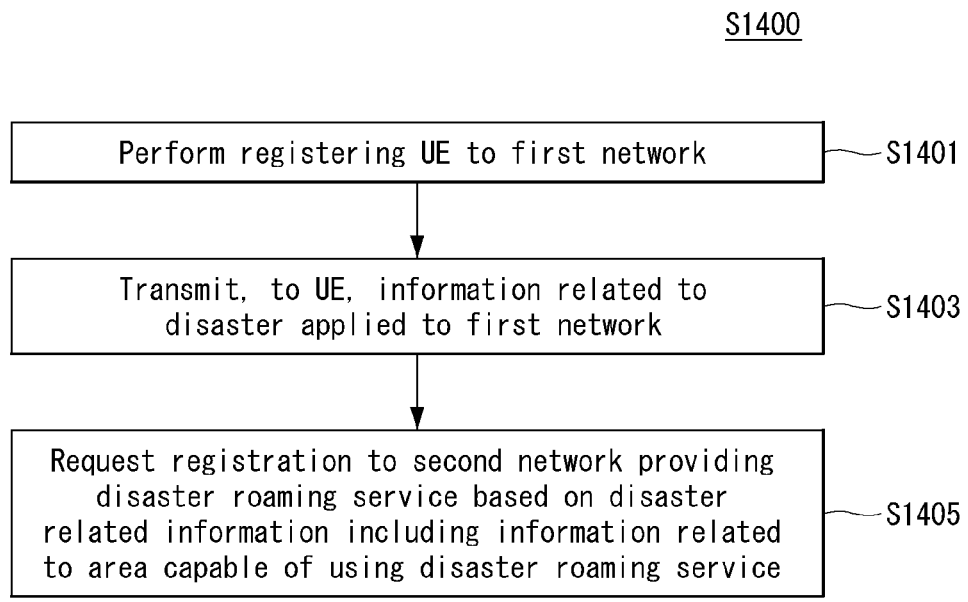
[FIG. 15]
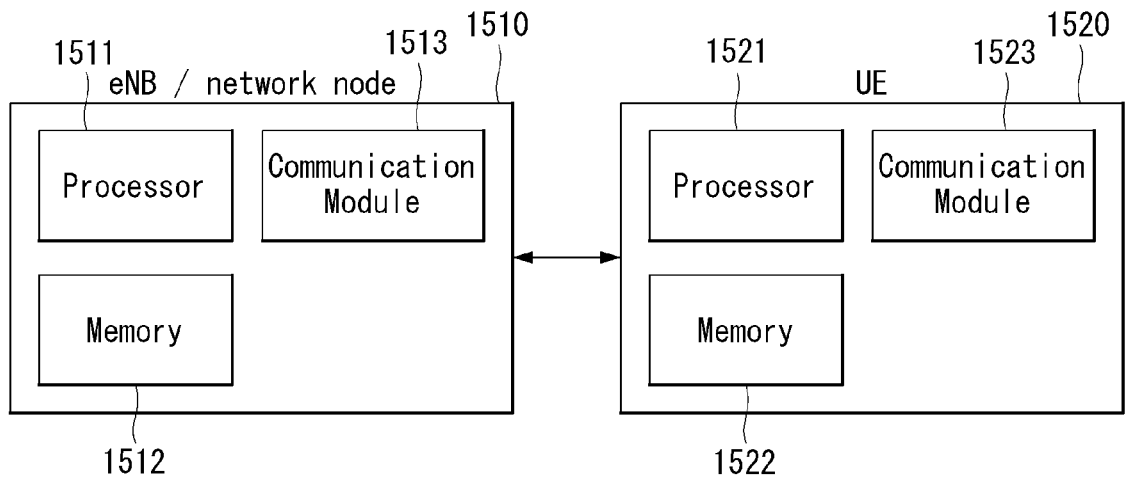

[FIG. 16]
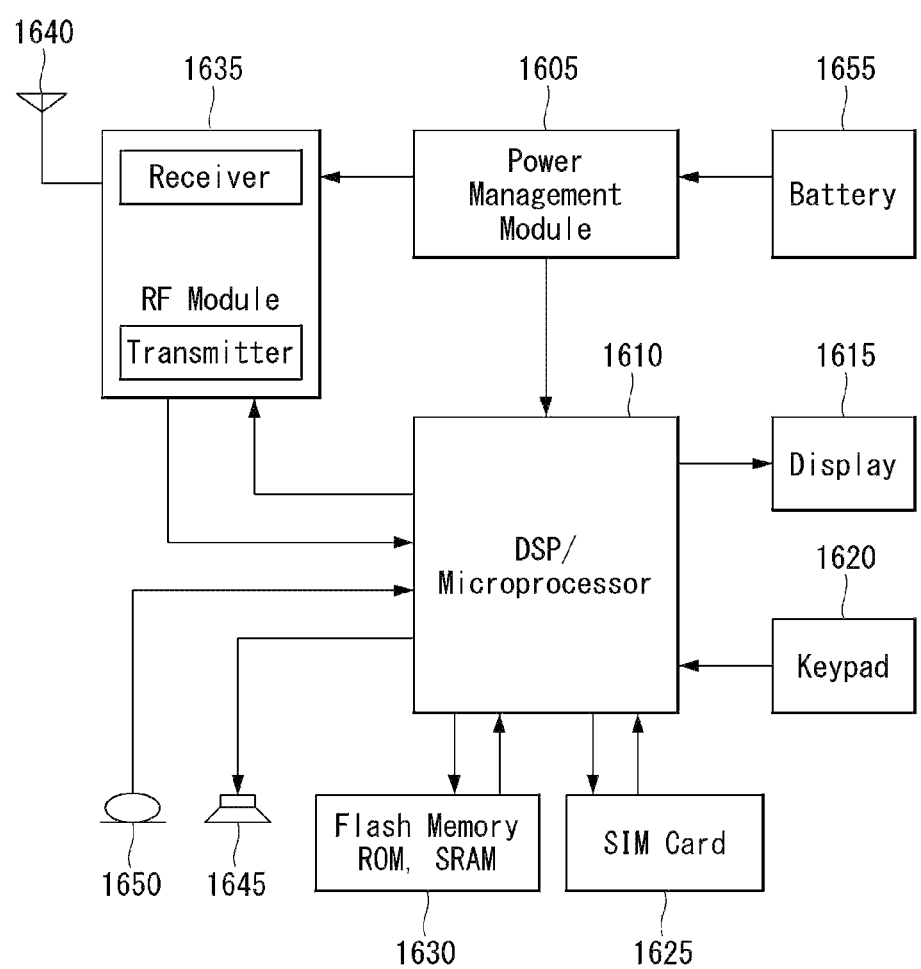

[FIG. 17]
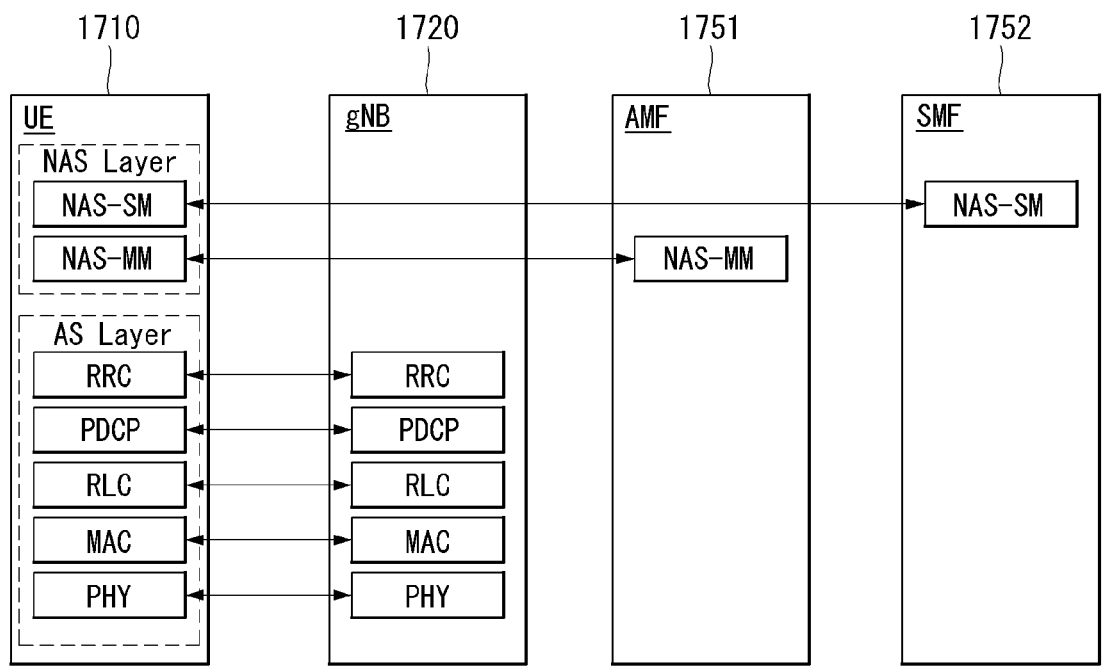

METHOD FOR ALLOWING REGISTRATION TO NETWORK IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/000214, filed on Jan. 6, 2020, which claims the benefit of Korean Patent Application No. 10-2019-0001413, filed on Jan. 4, 2019, and Korean Patent Application No. 10-2019-0037743, filed on Apr. 1, 2019, the contents of which are all hereby incorporated by reference herein in their entirety.

TECHNICAL FIELD

The present disclosure relates to a wireless communication system, and more particularly to a method for performing, by a user equipment (UE) and a base station, registration to a network in a wireless communication system, and a device therefor.

BACKGROUND ART

In a wireless communication system, mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

DISCLOSURE

Technical Problem

An object of the present disclosure is to provide a method for performing roaming to a network of other available surrounding service provider and providing services, when a UE is located in a service provision area of a service provider to which the UE subscribes, but the service provider cannot temporarily provide services.

Another object of the present disclosure is to provide a wireless communication system and method for providing services to a UE without causing additional service interruption of surrounding networks in a process in which the UE rapidly recognizes a problem in a network of a service provider, to which the UE subscribes, and moves to a new network without interruption of services as much as possible.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect, there is provided a method for performing, by a user equipment (UE), a registration to a network in a wireless communication system. More specifically, the method comprises performing a registration to a first public land mobile network (PLMN) via a first base station; receiving a disaster related message indicating that a disaster roaming service is provided; checking whether the UE is provided with the disaster roaming service based on the disaster related message; when the UE is provided with the disaster roaming service as a result of the check, selecting a second PLMN providing the disaster roaming service; transmitting a registration request message to the selected second PLMN based on the disaster related message; and receiving, from the second PLMN, a response message to the registration request message.

The disaster related message indicating that the disaster roaming service is provided is received to the UE due to a disaster related to the first PLMN or an area in which the UE is located.

The disaster related message includes at least one candidate PLMN list providing the disaster roaming service. The method further comprises selecting the second PLMN from among the at least one candidate PLMN list based on a pre-configured condition.

The disaster related message includes information that the second PLMN is related to a list of PLMNs allowing the disaster roaming service.

The checking comprises determining whether the first PLMN is included in the list of PLMNs allowing the disaster roaming service included in the disaster related message. The selecting comprises selecting the second PLMN providing the disaster roaming service when the first PLMN is included in the list of PLMNs allowing the disaster roaming service.

In another aspect, there is provided a user equipment (UE) performing a registration to a network in a wireless communication system. more specifically, the UE comprises an RF module configured to transmit and receive a radio signal; at least one processor functionally connected to the RF module; and at least one computer memory operationally connected to the at least one processor, wherein the at least one computer memory is configured to, upon execution, store instructions that allow the at least one processor to perform a registration to a first public land mobile network (PLMN) via a first base station; receive a disaster related message indicating that a disaster roaming service is provided; check whether the UE is provided with the disaster roaming service based on the disaster related message; when the UE is provided with the disaster roaming service as a result of the check, select a second PLMN providing the disaster roaming service; transmit a registration request message to the selected second PLMN based on the disaster related message; and receive, from the second PLMN, a response message to the registration request message.

The disaster related message indicating that the disaster roaming service is provided is received to the UE due to a disaster related to the first PLMN or an area in which the UE is located.

The disaster related message includes at least one candidate PLMN list providing the disaster roaming service. The method further comprises selecting the second PLMN from among the at least one candidate PLMN list based on a pre-configured condition.

The disaster related message includes information that the second PLMN is related to a list of PLMNs allowing the disaster roaming service.

The checking comprises determining whether the first PLMN is included in the list of PLMNs allowing the disaster roaming service included in the disaster related message. The selecting comprises selecting the second PLMN providing the disaster roaming service when the first PLMN is included in the list of PLMNs allowing the disaster roaming service.

In another aspect, there is provided a method for performing, by a user equipment (UE), an access to a network in a wireless communication system. More specifically, the method comprises receiving a disaster related message indicating that a disaster roaming service is provided due to a disaster; selecting a second PLMN providing the disaster roaming service based on the disaster related message; receiving access control related information in order to access the selected second PLMN; checking whether the access is feasible based on the access control related information; and performing the access to the second PLMN according to a result of checking whether the access is feasible.

Checking whether the access is feasible comprises, when the UE receives the disaster roaming service from the second PLMN, the UE checks whether the access is feasible using an access identity related to the disaster roaming service.

When the UE is allowed to access the second PLMN as the result of checking whether the access is feasible, the UE performs the access to the second PLMN.

When the UE is not allowed to access the second PLMN as the result of checking whether the access is feasible, the UE checks again whether the access to the second PLMN is feasible based on the access control related information after time that the access control related information is indicated.

The disaster related message further includes information that UEs of which PLMN can receive the disaster roaming service from the second PLMN, in order to indicate whether the UE can use an access identity related to the disaster roaming service.

Performing the access to the second PLMN comprises transmitting a registration request to the second PLMN, or performing an access for transmitting subsequently new data.

Advantageous Effects

The present disclosure can prevent interruption of services that a UE has received from a specific network.

According to the present disclosure, a UE can rapidly select other network upon roaming movement to other network even in a disaster situation occurring in a specific network, and thus a user can continuously use communication services even in an interruption situation of communication services.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates various reference points.

FIG. 5 illustrates an example of a network structure of an evolved universal terrestrial radio access network (E-UTRAN) to which the present disclosure is applicable.

FIG. 6 illustrates an example of a general architecture of E-UTRAN and EPC.

FIG. 7 illustrates an example of a structure of a radio interface protocol in a control plane between a UE and eNB.

FIG. 8 illustrates an example of a structure of a radio interface protocol in a user plane between a UE and eNB.

FIG. 9 illustrates a general architecture of NR-RAN.

FIG. 10 illustrates an example of general functional split between NG-RAN and 5GC.

FIG. 11 illustrates an example of a general architecture of 5G.

FIG. 12 illustrates a network selection method according to method 1-1.

FIG. 13 is a flow chart illustrating a method for a UE to select a network in accordance with an embodiment of the present disclosure.

FIG. 14 is a flow chart illustrating a method for a base station to register a UE to a network in accordance with an embodiment of the present disclosure.

FIG. 15 illustrates a block diagram of configuration of a communication device according to an embodiment of the present disclosure.

FIG. 16 illustrates a block diagram of configuration of a communication device according to an embodiment of the present disclosure.

FIG. 17 illustrates an example of a structure of a radio interface protocol in a control plane between a UE and eNodeB.

MODE FOR INVENTION

Reference will now be made in detail to embodiments of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Description of Terms in the Present Disclosure

In the present disclosure, a base station (BS) refers to a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced by terms such as a fixed station, Node B, evolved-NodeB (eNB), a base transceiver system (BTS), an access point (AP), and gNB (general NB). Further, a 'terminal' may be fixed or movable and may be replaced by terms such as user equipment (UE), a mobile station (MS), a user terminal (UT), a mobile subscriber station (MSS), a subscriber station (SS), an advanced mobile station (AMS), a wireless terminal (WT), a machine type communication (MTC) device, a machine-to-machine (M2M) device, and a device-to-device (D2D) device.

In the present disclosure, downlink (DL) refers to communication from the base station to the terminal, and uplink (UL) refers to communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and non-orthogonal multiple access (NOMA). The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, and E-UTRA (evolved UTRA). The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in downlink and adopts the SC-FDMA in uplink. LTE-advanced (A) is an evolution of the 3GPP LTE.

Embodiments of the present disclosure can be supported by standard documents disclosed in at least one of the IEEE 802, 3GPP, and 3GPP2 specifications regarding wireless access systems. In other words, in embodiments of the present disclosure, those steps or parts omitted for the purpose of clearly describing technical principles of the present disclosure can be supported by the standard documents. All the terms disclosed in the present disclosure can also be explained by the standard documents.

3GPP LTE/LTE-A is primarily described for clear description, but technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an internet protocol (IP) based packet switched core network, and an access network such as LTE and UTRAN. The EPS is a network of an evolved version of UMTS.

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE may refer to terms such as a terminal, a mobile equipment (ME), and a mobile station (MS). The UE can be a portable device such as a notebook computer, a cellular phone, a personal digital assistant (PDA), a smart phone, and a multimedia device, or a non-portable device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MTC apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) and eNodeB controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): a network node in the EPS network which performs mobility management and session management functions.

Packet Data Network Gateway (PDN-GW): a network node in the EPS network which performs UE IP address allocation, packet screening and filtering, and charging data collection functions.

Serving GW (Serving Gateway): a network node in the EPS network which performs functions such as mobility anchor, packet routing, idle mode packet buffering, and triggering of paging for the UE of MME.

Policy and Charging Rule Function (PCRF): a node in the EPS network which performs policy decision to dynamically apply differentiated QoS and billing policies per each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information. Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell' of the geographic area can be understood as a coverage in which a node can provide services using a carrier, and the "cell' of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use cases may focus on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity in which they are always turned on in order to push real-time information and notification to a user. A cloud storage and application suddenly increases in the mobile communication platform, and this can be applied to both business and entertainment. Furthermore, the cloud storage is a special use case that tows the growth of an uplink data transfer rate. 5G is also used for remote business of cloud. When a tactile interface is used, further lower end-to-end latency is required to maintain better user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use cases relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of megabits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, in VR games, in order for game companies to minimize latency, a core server may need to be integrated with the edge network server of a network operator.

An automotive is expected to be an important and new motive power in 5G, along with many use cases for the mobile communication of an vehicle. For example, entertainment for a passenger requires a high capacity and a high mobility mobile broadband at the same time. This reason is that future users continue to expect a high-quality connection regardless of their location and speed. Another use example of the automotive field is an augmented reality dashboard. The augmented reality dashboard overlaps and displays information, that identifies an object in the dark and notifies a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will focus on only abnormal traffics, which cannot be identified by a vehicle itself. Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. Similar configuration may be performed for each home. All of a temperature sensor, a window and heating controller, a burglar alarm and home appliances are wirelessly connected. Many of these sensors are typically a low data transfer rate, low energy and low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of suppliers and consumers, and thus the smart grid may improve the distribution of fuel, such as electricity, in an efficient, reliable, economical, production-sustainable and automated manner. The smart grid may be considered to be another sensor network with low latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, achieving the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically demands a low data speed, but requires a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI)

Artificial intelligence means the field in which artificial intelligence or methodology capable of making the artificial intelligence is researched. Machine learning means the field in which various problems handled in the artificial intelligence field are defined and methodology for solving the problems is researched. Machine learning is also defined as an algorithm for improving performance of a task through continuous experiences for the task.

An artificial neural network (ANN) is a model used in machine learning, and may refer to the entire model with a problem-solving ability which consists of artificial neurons (nodes) forming a network through a combination of synapses. The artificial neural network may be defined by a connection pattern between neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weights, and bias that are input through a synapse.

A model parameter means a parameter determined through learning, and includes the weight of a synapse connection and the bias of a neuron. Furthermore, a hyper parameter refers to a parameter that shall be configured before learning in a machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. The deep learning is part of the machine learning. Hereinafter, the machine learning is used as a meaning including the deep learning.

Robot

A robot may mean a machine that automatically processes a given task or operates based on an autonomously owned ability. Particularly, a robot having a function for recognizing and autonomously determining an environment and performing an operation may be called an intelligent robot.

The robot may be classified for industry, medical treatment, home, and military based on its use purpose or field.

The robot includes a driver including an actuator or motor, and can perform various physical operations, such as moving a robot joint. Furthermore, a movable robot includes a wheel, a brake, a propeller, etc. in the driver, and may run on the ground or fly in the air through the driver.

Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed such as adaptive cruise control, a technology for automatically driving along a fixed path, a technology for automatically setting and driving a path when a destination is set, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this instance, the self-driving vehicle may be considered as a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object together. However, there is a difference in that a virtual object is used to supplement a real object in the AR technology, and on the other hand, a virtual object and a real object are used as the same character in the MR technology.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from the external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model constructed by an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with a learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform operation determined by controlling the components of the AI device 100.

To this end, the processor 180 can request, search, receive, or utilize data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 130, may have been trained by the learning processor 240 of the AI server 200, or may have been trained by distributed processing thereof.

The processor 180 may collect history information including the feedback, etc. of the user for the operation contents or an operation of the AI device 100, and may store the history information in the memory 170 or the learning processor 130 or may transmit the history information to an external device such as the AI server 200. The collected history information may be used to update a learning model.

The processor 180 may control at least some of the components of the AI device 100 in order to run an application program stored in the memory 170. Moreover, the processor 180 may combine and operate two or more of the components included in the AI device 100 in order to run the application program.

FIG. 2 illustrates an AI server 200 according to an embodiment of the present disclosure.

Referring to FIG. 2, the AI server 200 may refer to a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least a part of AI processing.

The AI server 200 may include a communication unit 210, a memory 230, a learning processor 240, and a processor 260.

The communication unit 210 may transmit and receive data to and from an external device such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network, or may be mounted on an external device such as the AI device 100 and used.

The learning model may be implemented as hardware, software or a combination of hardware and software. If a part or all of the learning model is implemented as software, one or more instructions constructing the learning model may be stored in the memory 230.

The processor 260 may deduce a result value of new input data using the learning model and generate a response or a control command based on the deduced result value.

FIG. 3 illustrates an AI system 1 according to an embodiment of the present disclosure.

Referring to FIG. 3, in the AI system 1, at least one of the AI server 200, a robot 100a, a self-driving vehicle 100b, an XR device 100c, a smartphone 100d, or home appliances 100e is connected to a cloud network 10. The robot 100a, the self-driving vehicle 100b, the XR device 100c, the smartphone 100d or the home appliances 100e to which the AI technology is applied may be called AI devices 100a to 100e.

The cloud network 10 may constitute part of cloud computing infra or may mean a network present within cloud computing infra. The cloud network 10 may be configured using the 3G network, the 4G or long term evolution (LTE) network, or the 5G network.

That is, the devices 100a to 100e and 200 constituting the AI system 1 may be interconnected over the cloud network 10. In particular, the devices 100a to 100e and 200 may communicate with each other through a base station, or may directly communicate with each other without the intervention of the base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that are AI devices constituting the AI system 1, over the cloud network 10, and may help at least part of the AI processing of the connected AI devices 100a to 100e.

The AI server 200 can train an artificial neural network based on a machine learning algorithm in place of the AI devices 100a to 100e, and can directly store a learning model or transmit the learning model to the AI devices 100a to 100e.

The AI server 200 can receive input data from the AI devices 100a to 100e, deduce a result value of the received input data using the learning model, generate a response or control command based on the deduced result value, and transmit the response or control command to the AI devices 100a to 100e.

Alternatively, the AI devices 100a to 100e can directly deduce a result value of input data using a learning model, and can generate a response or a control command based on the deduced result value.

Various implementations of the AI devices 100a to 100e to which the above-described technologies are applied are described below. Herein, the AI devices 100a to 100e illustrated in FIG. 3 may be considered as detailed implementations of the AI device 100 illustrated in FIG. 1.

AI and Robot to which the Present Disclosure is Applicable

The AI technology is applied to the robot 100a, and the robot 100a may be implemented as a guidance robot, a transport robot, a cleaning robot, a wearable robot, an entertainment robot, a pet robot, an unmanned aerial robot, etc.

The robot 100a may include a robot control module for controlling an operation. The robot control module may mean a software module or a chip in which a software module is implemented using hardware.

The robot 100a may obtain status information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor of LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Herein, the learning model may have been directly trained in the robot 100a or may have been trained in an external device such as the AI server 200.

The robot 100a may directly generate results using the learning model and perform an operation, but may perform an operation by transmitting sensor information to an external device such as the AI server 200 and receiving results generated in response to this.

The robot 100a may determine the moving path and the running plan using at least one of map data, object information detected from sensor information, or object information obtained from the external device. The robot 100a may run along the determined moving path and running plan by controlling the driver.

The map data may include object identification information for various objects disposed in the space in which the robot 100a moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100a may perform an operation or run by controlling the driver based on a user's control/interaction. In this case, the robot 100a may obtain intention information of interaction according to a user's behavior or voice utterance, may determine a response based on the obtained intention information, and may perform an operation.

AI and Self-Driving to which the Present Disclosure is Applicable

The AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain status information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information from external devices, or may receive information that is directly recognized from the external devices.

The self-driving vehicle 100b may perform the above operations using a learning model consisting of at least one artificial neural network. For example, the self-driving vehicle 100b may recognize a surrounding environment and object using a learning model and determine a running path using the recognized surrounding environment information or object information. Herein, the learning model may have been directly trained in the self-driving vehicle 100b or may have been trained in an external device such as the AI server 200.

In this instance, the self-driving vehicle 100b may directly generate results using the learning model to perform an operation, but may perform an operation by transmitting sensor information to an external device such as the AI server 200 and receiving results generated in response to this.

The self-driving vehicle 100b may determine a moving path and a running plan using at least one of map data, object information detected from sensor information, or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 100b may perform an operation or run by controlling the driver based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

The AI technology is applied to the XR device 100c, and the XR device 100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 100c may output an XR object including additional information for a recognized object by making the XR object correspond to the corresponding recognized object.

The XR device 100c may perform the above operations using a learning model consisting of at least one artificial neural network. For example, the XR device 100c may recognize a real object in 3D point cloud data or image data using a learning model, and may provide information corresponding to the recognized real object. In this case, the learning model may have been directly trained in the XR device 100c or may have been trained in an external device such as the AI server 200.

In this instance, the XR device 100c may directly generate results using a learning model and perform an operation, but may perform an operation by transmitting sensor information to an external device such as the AI server 200 and receiving results generated in response to this.

AI, Robot and Self-Driving to which the Present Disclosure is Applicable

The AI technology and the self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology are applied may mean a robot itself having a self-driving function, or may mean the robot 100a interacting with the self-driving vehicle 100b.

The robot 100a with the self-driving function may collectively refer to devices that move by itself along a given path without control of a user or determine by itself a moving path and move.

The robot 100a with the self-driving function and the self-driving vehicle 100b may use a common sensing method to determine one or more of a moving path or a running plan. For example, the robot 100a with the self-driving function and the self-driving vehicle 100b may determine one or more of a moving path or a running plan using information sensed through LIDAR, radar, a camera, etc.

The robot 100a interacting with the self-driving vehicle 100b is present separately from the self-driving vehicle 100b, and may perform an operation associated with a self-driving function inside or outside the self-driving vehicle 100b or an operation associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if it is determined that a driver is in a drowsiness state, the robot 100a may activate the self-driving function of the self-driving vehicle 100b or assist control of a driving unit of the self-driving vehicle 100b. Herein, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information including signal information, etc., as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

The AI technology and the XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology is applied may mean a robot that is a target of control/interaction within an XR image. In this case, the robot 100a is different from the XR device 100c, and they may operate in conjunction with each other.

If the robot 100a that is a target of control/interaction within the XR image obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at time of the robot 100a remotely operating in conjunction through an external device such as the XR device 100c, may adjust a self-driving path of the robot 100a through an interaction, may control an operation or driving, or may identify information of a surrounding object.

AI, Self-Driving and XR to which the Present Disclosure is Applicable

The AI technology and the XR technology are applied to the self-driving vehicle 100b, and the self-driving vehicle 100b may be implemented as a mobile robot, a vehicle, an unmanned aerial vehicle, etc.

The self-driving vehicle 100b to which the XR technology is applied may mean a self-driving vehicle provided with a means for providing an XR image or a self-driving vehicle that is a target of control/interaction within the XR image. Particularly, the self-driving vehicle 100b that is the target of control/interaction within the XR image is different from the XR device 100c, and they may operate in conjunction with each other.

The self-driving vehicle 100b provided with the means for providing the XR image may obtain sensor information from sensors including a camera, and may output the XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 100b, at least a part of the XR object may be output to overlap with an object within a screen. For example, the self-driving vehicle 100b may output XR objects corresponding to objects, such as a carriageway, other vehicles, a traffic light, a signpost, a two-wheeled vehicle, a pedestrian, and a building.

If the self-driving vehicle 100b that is a target of control/interaction within an XR image obtains sensor information from sensors including a camera, the self-driving vehicle 100b or the XR device 100c may create an XR image based on the sensor information, and the XR device 100c may output the created XR image. Furthermore, the self-driving vehicle 100b may operate based on a control signal received through an external device, such as the XR device 100c, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution or a clean-state structure of an existing mobile communication network structure.

The 5G system is defined as service-based, and the interaction between network functions (NFs) in architecture for the 5G system can be represented in two ways as follows.

Reference point representation: shows the interaction between NF services in NFs described by a point-to-point reference point (e.g., N11) between two NFs (e.g., AMF and SMF).

Service-based representation: network functions (e.g., AMF) within a control plane (CP) enable other authorized network functions to access their services. This representation also includes a point-to-point reference point, if necessary.

3GPP System Overview

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions of security procedures, terminal-to-network session handling, idle terminal location management, etc.

The SGSN handles all packet data such as mobility management and authentication of the user for another 3GPP network (e.g., GPRS network).

The ePDG serves as a security node for an untrusted non-3GPP network (e.g., I-WLAN, WiFi hotspot, etc.).

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 4, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

FIG. 5 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 5, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The S1 interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 6 illustrates an example of a general architecture of E-UTRAN and EPC.

As illustrated in FIG. 6, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging generation in the EPC, management of an LTE_IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

FIG. 7 illustrates an example of a structure of a radio interface protocol in a control plane between a UE and eNB. FIG. 8 illustrates an example of a structure of a radio interface protocol in a user plane between a UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 7 and the layers of the radio protocol in the user plane illustrated in FIG. 8 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer illustrated in FIG. 7 is described in detail below.

The evolved session management (ESM) belonging to the NAS layer performs functions such as default bearer management and dedicated bearer management, and is responsible for controlling the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

FIG. 9 illustrates a general architecture of NR-RAN.

Referring to FIG. 9, the NR-RAN node may be one of the followings.

gNB providing NR user plane and control plane protocols towards the UE; or ng-eNB providing E-UTRA user plane and control plane protocols towards the UE.

The gNB and the ng-eNB are interconnected with each other by means of the Xn interface. The gNB and ng-eNB are also interconnected with the access and mobility management function (AMF) by means of the NG interface to 5GC, more specifically, by means of the NG-C interface, and are interconnected with the user plane function (UPF) by means of the NG-U interface (see 3GPP TS 23.501 [3]).

For reference, architecture and F1 interface for functional split are defined in 3GPP TS 38.401 [4].

FIG. 10 illustrates an example of general functional split between NG-RAN and 5GC.

Referring to FIG. 10, yellow boxes depict logical nodes, and white boxes depict main functions.

The gNB and ng-eNB host the following functions.

Functions for Radio Resource Management: radio bearer control, radio admission control, connection mobility control, and dynamic allocation of resources to UEs in both uplink and downlink (scheduling);

IP header compression, encryption and integrity protection of data;

Selection of an AMF at IMT-2000 3GPP-UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;

Distribution function for NAS messages;

Radio access network sharing;

Dual connectivity;

Tight interworking between NR and E-UTRA.

The AMF hosts the following main functions (see 3GPP TS 23.501 [3]).

NAS signalling termination;

NAS signalling security;

AS security control;

Inter CN node signalling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing;

SMF selection.

The UPF hosts the following main functions (see 3GPP TS 23.501 [3]).

Anchor point for intra-/inter-RAT mobility (when applicable);

External PDU session point of interconnect to data network;

Packet routing and forwarding;

Packet inspection and user plane part of policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping);

Downlink packet buffering and downlink data notification triggering.

The session management function (SMF) hosts the following main functions (see 3GPP TS 23.501 [3]).

Session management;
UE IP address allocation and management;
Selection and control of UP function;
Configure traffic steering at UPF to route traffic to proper destination;
Control part of policy enforcement and QoS;
Downlink data notification.

FIG. 11 illustrates an example of a general architecture of 5G.

The following is given a description for each reference interface and each node illustrated in FIG. 11.

An access and mobility management function (AMF) supports functions of inter-CN node signaling for mobility between 3GPP access networks, termination of radio access network (RAN) CP interface (N2), termination of NAS signaling (N1), registration management (registration area management), idle mode UE reachability, support of network slicing, SMF selection, and the like.

Some or all of the functions of the AMF can be supported in a single instance of one AMF.

A data network (DN) means, for example, operator services, internet access, or 3rd party service, etc. The DN transmits a downlink protocol data unit (PDU) to the UPF or receives the PDU transmitted from the UE from the UPF.

A policy control function (PCF) receives information about packet flow from an application server and provides functions of determining policies such as mobility management and session management.

A session management function (SMF) provides a session management function. If the UE has a plurality of sessions, the sessions can be respectively managed by different SMFs.

Some or all of the functions of the SMF can be supported in a single instance of one SMF.

A unified data management (UDM) stores subscription data of user, policy data, etc.

A user plane function (UPF) transmits the downlink PDU received from the DN to the UE via the (R)AN and transmits the uplink PDU received from the UE to the DN via the (R)AN.

An application function (AF) interacts with 3GPP core network to provide services (e.g., to support functions of an application influence on traffic routing, network capability exposure access, interaction with policy framework for policy control, and the like).

A (radio) access network (R)AN collectively refers to a new radio access network supporting both evolved E-UTRA, that is an evolved version of 4G radio access technology, and a new radio (NR) access technology (e.g., gNB).

The gNB supports functions for radio resource management (i.e., radio bearer control, radio admission control, connection mobility control, and dynamic allocation of resources to UEs in uplink/downlink (i.e., scheduling)).

The UE means a user equipment.

In the 3GPP system, a conceptual link connecting between the NFs in the 5G system is defined as a reference point.

N1 is a reference point between the UE and the AMF, N2 is a reference point between the (R)AN and the AMF, N3 is a reference point between the (R)AN and the UPF, N4 is a reference point between the SMF and the UPF, N6 is a reference point between the UPF and the data network, N9 is a reference point between two core UPFs, N5 is a reference point between the PCF and the AF, N7 is a reference point between the SMF and the PCF, N24 is a reference point between the PCF in the visited network and the PCF in the home network, N8 is a reference point between the UDM and the AMF, N10 is a reference point between the UDM and the SMF, N11 is a reference point between the AMF and the SMF, N12 is a reference point between the AMF and an authentication server function (AUSF), N13 is a reference point between the UDM and the AUSF, N14 is a reference point between two AMFs, N15 is a reference point between the PCF and the AMF in case of non-roaming scenario and a reference point between the PCF in the visited network and the AMF in case of roaming scenario, N16 is a reference point between two SMFs (reference point between the SMF in the visited network and the SMF in the home network in case of roaming scenario), N17 is a reference point between AMF and 5G-equipment identity register (EIR), N18 is a reference point between the AMF and an unstructured data storage function (UDSF), N22 is a reference point between the AMF and a network slice selection function (NSSF), N23 is a reference point between the PCF and a network data analytics function (NWDAF), N24 is a reference point between the NSSF and the NWDAF, N27 is a reference point between a network repository function (NRF) in the visited network and the NRF in the home network, N31 is a reference point between NSSF in the visited network and NSSF in the home network, N32 is a reference point between security protection proxy (SEPP) in the visited network and SEPP in the home network, N33 is a reference point between a network exposure function (NEF) and the AF, N40 is a reference point between the SMF and a charging function (CHF), and N50 is a reference point between the AMF and a circuit bearer control function (CBCF).

FIG. 11 illustrates a reference model where the UE accesses to one DN using one PDU session, by way of example, for convenience of explanation, but the present invention is not limited thereto.

The following has been described based on the EPS system using the eNB for convenience of explanation. However, the EPS system may be replaced with the 5G system by replacing the eNB by the gNB, the mobility management (MM) function of the MME by the AMF, the SM function of S/P-GW by the SMF, and the user plane-related function of the S/P-GW by the UPF.

In the above, the present disclosure has been described based on the EPS, but the corresponding content can be supported by going through similar operations through processes/messages/information for similar purpose in the 5G system.

PLMN Selection Procedure

The following Table 2 is content related to a PLMN selection defined in 3GPP TS 22.011.

TABLE 2

The UE shall select and attempt registration on other PLMNs, if available and allowable, if the location area is not in the list of "forbidden LAs for roaming" and the tracking area is not in the list of "forbidden TAs for roaming" (see 3GPP TS 23.122 [3]), in the following order:
i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service.
ii) Each entry in the "User Controlled PLMN Selector with

TABLE 2-continued

Access Technology" data field in the SIM/USIM (in priority order). It shall be possible to configure a voice capable UE so that it shall not attempt registration on a PLMN if all cells identified as belonging to the PLMN do not support the corresponding voice service.
iii) Each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.
iv) Other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service.
v) All other PLMN/access technology combinations in order of decreasing signal quality. It shall be possible to configure a voice capable UE so that it shall not attempt registration on a PLMN if all cells identified as belonging to the PLMN do not support the corresponding voice service.
In the case of a UE operating in UE operation mode A or B, an allowable PLMN is one which is not in the "Forbidden PLMN" data field in the SIM/USIM. This data field may be extended in the ME memory (see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.
If successful registration is achieved, the UE shall indicate the selected PLMN.

Roaming Steering

The following Table 3 represents a method of affecting the PLMN selection in relation to the registration, and is described in TS 22.011.

TABLE 3

Steering to a specific VPLMN

It shall be possible for the HPLMN at any time to direct a UE, that is in automatic mode, to search for a specific VPLMN and, if it is available, move to that VPLMN as soon as possible. This VPLMN shall then be regarded as the highest priority VPLMN as defined by the operator, though any EHPLMN or PLMN on the User Controlled PLMN list shall have higher priority. This process shall be done transparently and without inconvenience to the user.
If the UE is in manual mode, the steering request shall be ignored.
If the UE is registered on a VPLMN that is present on the User Controlled PLMN List, the steering request shall be ignored. PLMNs contained on the User Controlled PLMN List shall have priority over the steered-to-PLMN.
The UE shall attempt to register on the specified VPLMN even if the specified VPLMN is present on a Forbidden List.
This mechanism shall be available to the HPLMN even if the VPLMN the UE is registered on is compliant to an earlier release of the 3GPP specifications.

VPLMN Redirection

It shall be possible for the HPLMN to request a UE, that is in automatic mode, to find and register on a different VPLMN from the one it is currently using or trying to register on, if another VPLMN, that is not in a Forbidden List, is available. The original VPLMN shall then be treated as the lowest priority VPLMN and would not be selected by the UE unless it is the only one available to the UE or has been selected in manual mode. This process shall be done transparently and without inconvenience to the user.
If the UE is in manual mode, the redirection request shall be ignored.
If the UE is registered on a VPLMN that is present on the User Controlled PLMN List, the redirection request shall be ignored.
This mechanism shall be available to the HPLMN even if the VPLMN the UE is registered on is compliant to an earlier release of the 3GPP specifications.

EMBODIMENTS OF THE PRESENT DISCLOSURE

As the mobile communication services have become an indispensable service in daily life, each mobile service provider is making various attempts to prevent interruption of services. For example, the mobile service providers use a plurality of wired networks in a core network duration in a wireless network or install a plurality of core networks such as AMFs/MMEs, and thus can prevent interruption of communication services by performing backup in other network node even if there is a problem in one network node.

However, in the event of a disaster such as a fire or an earthquake, the above measures may not be helpful. For example, this is because, in the event of a fire, all communication cables connected to the outside from one node of the wireless network may be lost. For example, in a virtualized cloud environment, the plurality of core networks such as AMFs/MMEs are highly likely to be implemented in one data center located in the same area. In addition, if the data center is located at a central point of the earthquake, there is a high possibility that all functions will be lost no matter how the plurality of AMFs/MMEs are implemented.

Accordingly, the most efficient way is to think of roaming. That is, if the UE cannot receive communication services since there is a problem in a network of a mobile service provider to which the UE subscribes, the UE can roam to a network of other surrounding mobile service provider and receive communication services. Each mobile service provider installs wireless networks and core networks in its licensed area, installs networks in a different building, and builds networks in a different way. Hence, the disasters listed as examples in the preceding description may not have the same impact on all the mobile service providers.

Each mobile service provider actively installs wireless networks and core networks in an area where he/she has obtained a license from an actual legal institution and obtained a business right, but cannot install the wireless/core networks in other areas because there is no business right. For example, if any UE leaves an area or a country to which it subscribes, the UE receives roaming service over a network of other service provider. However, if the UE is located in the area or country to which it subscribes, the UE cannot receive the roaming service in the area due to a relationship between the mobile service providers competing with each other in the area.

In particular, in the case of a roaming service in an overseas area, when the UE is turned on in a new area, the UE automatically activates the roaming service since the UE cannot discover the network of the mobile service provider to which the UE subscribes. However, if the UE is located in an area where its provider mainly conducts business, the UE does not activate the roaming service and thus cannot receive the roaming service in the disaster situation as described above.

In particular, depending on the reason why the mobile service provider, to which the UE subscribes, cannot provide the communication services, a service interruption time for which actual service is not provided to the UE may vary variously. For example, when the power supply to a wireless network is interrupted, the wireless network does not generate any radio waves. Therefore, the UE can recognize a problem of its subscribed network by detecting a radio wave reception failure. However, if wired communication lines of a wireless network and a core network are cut off, the wireless network still generates radio waves. Therefore, it is highly likely that the UE will recognize that the communication network is still alive and will not take any action. If someone attempts to make a call to the UE, the UE may not recognize it.

Accordingly, in the above case, the UE moves to other surrounding communication networks and shall get services. That is, even if the UE is in the country in which a communication network, to which the UE subscribes, is located, the UE shall access a network of other mobile service providers.

However, when the UE attempts to access other surrounding network as above, there may occur a problem in that the surrounding network cannot smoothly provide services due to an additional signal increase in the surrounding network if a large number of UEs attempt to access the surrounding network at once.

Accordingly, the present disclosure is to provide communication services to a UE while minimizing an additional communication service failure in a surrounding network in a process in which any UE efficiently moves to other communication network when a problem occurs in a communication network that the UE accesses and thus the UE cannot get communication services from the communication network.

Method 1

In order to achieve this, in the present disclosure, when a UE receives, from a base station connected to a currently accessed PLMN, a message including an indication that the UE can no longer get communication services from the PLMN, that the UE accesses currently, and shall use other surrounding PLMN, the UE may additionally receive information about the other surrounding PLMN from the base station through the message. The message may include an indication that allows the UE to access other PLMN. Hence, the UE may perform the access to the indicated PLMN based on the message.

In this process, if the message indicates a specific PLMN, the UE may perform the access to the indicated PLMN. If the message indicates a plurality of PLMNs, the UE may select one PLMN based on the message when the message includes information related to a selection weight. If there is no information related to the selection weight, the UE may select randomly one PLMN.

Method 1-1

Method 1-1 describes an example of the method 1.

FIG. 12 illustrates a network selection method according to method 1-1.

As illustrated in FIG. 12, a first base station 1211 (RAN 1) may detect a failure of a first PLMN 1213 (CN 1) (core network 1), in S1201.

Next, the first base station may transmit, to a UE, a list of candidate networks (PLMNs), in S1203. For example, if it is determined that communication services cannot be provided to the UE due to a problem of the core network 1, the first base station may indicate the UE to select other PLMN through a message, and at the same time, transmit the message to the UE by including a list of a plurality of selectable PLMNs in the message.

Next, the UE may select a PLMN, that the UE will access newly, based on the message received from the first base station, in S1205.

Next, the UE may perform camping/registration on the selected PLMN, in S1207.

For example, the message illustrated in FIG. 12 may be a system information block (SIB) message, and the SIB may contain the following content.

SIB1 contains information relevant when evaluating if a UE is allowed to access a cell, and defines the scheduling of other system information. It also contains radio resource configuration information that is common for all UEs and barring information applied to the unified access control.

The content of a SIB1 message is as follows.

Signalling radio bearer: N/A
RLC-SAP: TM
Logical channel: BCCH
Direction: Network to UE Table 4 is an example of the SIB1 message.

TABLE 4

```
-- ASN1START
-- TAG-SIB1-START
SIB1 ::=        SEQUENCE {
  cellSelectionInfo                              SEQUENCE {
    q-RxLevMin                                     Q-RxLevMin,
    q-RxLevMinOffset                                     INTEGER (1 .. 8)
OPTIONAL,   -- Need R
    q-RxLevMinSUL                                        Q-RxLevMin
OPTIONAL,   -- Need R
    q-QualMin                                            Q-QualMin
OPTIONAL,   -- Need R
    q-QualMinOffset                                      INTEGER (1 .. 8)
OPTIONAL   -- Need R
  }
OPTIONAL,   -- Need S
  cellAccessRelatedInfo                          CellAccessRelatedInfo,
  connEstFailureControl                                ConnEstFailureControl
OPTIONAL,   -- Need R
  si-SchedulingInfo                                    SI-SchedulingInfo
OPTIONAL,   -- Need R
  servingCellConfigCommon                              ServingCellConfigCommonSIB
OPTIONAL,   -- Need R
  ims-Emergency Support                                ENUMERATED {true}
OPTIONAL,   -- Need R
  eCallOverIMS-Support                                 ENUMERATED {true}
OPTIONAL,   -- Cond Absent
  ue-TimersAndConstants                                UE-TimersAndConstants
OPTIONAL, -- Need R
  uac-BarringInfo                                SEQUENCE {
    uac-BarringForCommon                                 UAC-BarringPerCatList
OPTIONAL,   -- Need S
    uac-BarringPerPLMN-List                              UAC-BarringPerPLMN-List
```

TABLE 4-continued

```
OPTIONAL,  -- Need S
    uac-BarringInfoSetList              UAC-BarringInfoSetList,
    uac-AccessCategory 1-Selection AssistanceInfo CHOICE {
        plmnCommon                      UAC-AccessCategory 1-
SelectionAssistanceInfo,
        individualPLMNList              SEQUENCE (SIZE
(2 .. maxPLMN)) OF UAC-AccessCategory 1-SelectionAssistanceInfo
    }
OPTIONAL
}
OPTIONAL,  -- Need R
    useFullResumeID                     ENUMERATED {true}
OPTIONAL,  -- Need N
SelectOtherPLMN                         Boolean
    lateNonCriticalExtension            OCTET STRING
OPTIONAL,
    nonCriticalExtension                SEQUENCE{ }
OPTIONAL
}
UAC-AccessCategory 1-Selection AssistanceInfo ::= ENUMERATED {a, b, c}
-- TAG-SIB1-STOP
-- ASNISTOP
```

Table 5 is an example of SIB1 field descriptions.

TABLE 5

SIB1 field descriptions q-QualMin

Parameter "$Q_{qualmin}$" in TS 38.304 [20], applicable for serving cell. If the field is not present, the UE applies the (default) value of negative infinity for $Q_{qualmin}$.
q-QualMinOffset Parameter "$Q_{qualminoffset}$" in TS 38.304 [20]. Actual value $Q_{qualminoffset}$ = field value [dB]. If *cellSelectionInfo* is not present or the field is not present, the UE applies the (default) value of 0 dB for $Q_{qualminoffset}$. Affects the minimum required quality level in the cell.
q-RxLevMin Parameter "$Q_{rxlevmin}$" in TS 38.304 [20], applicable for serving cell.
q-RxLevMinOffset Parameter "$Q_{rxlevminoffset}$" in TS 38.304 [20]. Actual value $Q_{rxlevminoffset}$ = field value * 2 [dB]. If absent, the UE applies the (default) value of 0 dB for $Q_{rxlevminoffset}$. Affects the minimum required Rx level in the cell.
q-RxLevMinSUL Parameter "$Q_{rxlevminSUL}$" in TS 38.304 [4], applicable for serving cell
uac-BarringForCommon Common access control parameters for each access category. Common values are used for all PLMNs, unless overwritten by the PLMN specific configuration provided in *uac-BarringPerPLMN-List*. The parameters are specified by providing an index to the set of configurations (*uac-BarringInfoSetList*). UE behaviour upon absence of this field is specified in section 5.3.14.2.
useFullResumeID Indicates which resume identifier and Resume request message should be used. UE uses full I-RNTI and *RRCResumeRequest1* if the field is present, or short I-RNTI and *RRCResume Request* if the field is absent.
uac-AccessCategory1-SelectionAssistanceInfo Information used to determine whether Access Category 1 applies to the UE, as defined in [25]. A UE compliant with this version of the specification shall ignore this field.

TABLE 5-continued

SIB1 field descriptions selectotherPLMN

Indicates whether the UE should select other PLMN.
CandidatePLMNs

When selectotherPLMN is indicated, this information shows the candidate PLMNs which support emergency roaming. This information can further include weighing factor in selecting target PLMN.

Table 6 represents an explanation of SIB1 field.

TABLE 6

| Conditional Presence | Explanation |
|---|---|
| Absent | The field is not used in this version of the specification, if received, the UE shall ignore. |

That is, the first base station may transmit the SIB1 message to the UE by including SelectOtherPLMN or information of purpose/name similar to this in the SIB1 message. The UE receiving this may select/access other PLMN not a PLMN that the UE accesses currently.

The first base station may transmit the SIB1 message to the UE by including a candidate PLMN list in the SIB1 message. The candidate PLMN list includes PLMNs that are connected to a base station transmitting the information among surrounding PLMNs and support roaming to UEs in a disaster situation by concluding a service arrangement. Thus, according to SelectOtherPLMN, if CandidatePLMN information is included in a message received from the base station, the UE selecting other PLMN may preferentially attempt registration to the PLMN included in the candidate PLMN list.

In addition, the CandidatePLMN information may include a weighting factor determined based on a communication situation of each PLMN among candidate PLMNs. For example, if any UE subscribing to MNO A receives, from a base station of the MNO A, an indication that the UE shall move to other PLMN, and receives an indication for MNO B and MNO C through the candidate PLMN, the UE may receive an indication that the UE shall select the MNO B and the MNO C in a ratio of 7:3. The UE may set the probability of selecting the MNO B to 7 and set the probability of selecting the MNO C to 3 using a random number or an internal algorithm, select one of the MNO B and the MNO C according to the probability value, preferentially select the selected PLMN, and attempt registration to the PLMN.

Hence, in the example, when the MNO A fails to properly provide services, the UE may flock to one of the MNO B and the MNO C and thus prevent these networks from additionally occurring a problem.

As above, a method of informing a problem of a current PLMN via SIB (or MIB, etc.) may be applied to a UE that is in an idle mode or an RRC inactive mode. However, a base station may also indicate more rapidly a UE in an RRC Connected mode to move to other PLMN using information such as RRC Release. For example, the same information as that described in the method 1-1 may be transmitted to the UE via RRCRelease below.

RRCRelease

The RRCRelease message is used to command the release of an RRC connection or the suspension of the RRC connection.

Signalling radio bearer: SRB1
RLC-SAP: AM
Logical channel: DCCH
Direction: Network to UE The RRC Release message is the same as the following Table 7.

TABLE 7

```
-- ASN1START
-- TAG-RRCRELEASE-START
RRCRelease ::=                      SEQUENCE {
    rrc-TransactionIdentifier       RRC-TransactionIdentifier,
    criticalExtensions              CHOICE {
        rrcRelease                      RRCRelease-IEs,
        criticalExtensionsFuture        SEQUENCE { }
    }
}
RRCRelease-IEs ::=                  SEQUENCE {
    redirectedCarrierInfo                                           RedirectedCarrierInfo
OPTIONAL, -- Need N
    SelectOtherPLMN                                                 SelectOtherPLMN
    cellReselectionPriorities                                       CellReselectionPriorities
OPTIONAL, -- Need R
    suspendConfig                                                   SuspendConfig
OPTIONAL, -- Need R
    deprioritisationReq             SEQUENCE {
        deprioritisationType            ENUMERATED {frequency, nr},
        deprioritisationTimer           ENUMERATED {min5, min10, min15,
min30}
    }
OPTIONAL, -- Need N
    lateNonCriticalExtension                                        OCTET STRING
OPTIONAL,
    nonCriticalExtension                                            SEQUENCE{ }
OPTIONAL
}
RedirectedCarrierInfo ::=           CHOICE {
    nr                                  CarrierInfoNR,
    eutra                               RedirectedCarrierInfo-EUTRA,
    ...
}
RedirectedCarrierInfo-EUTRA ::=     SEQUENCE {
    eutraFrequency                      ARFCN-ValueEUTRA,
    cnType-r15                          ENUMERATED {epc,fiveGC}
OPTIONAL
}
CarrierInfoNR ::=                   SEQUENCE {
    carrierFreq                         ARFCN-ValueNR,
    ssbSubcarrierSpacing                SubcarrierSpacing,
    smtc                                                            SSB-MTC
OPTIONAL, -- Need S
    ...
}
SuspendConfig ::=                   SEQUENCE {
    fullI-RNTI                          I-RNTI-Value,
    shortI-RNTI                         ShortI-RNTI-Value,
    ran-PagingCycle                     PagingCycle,
    ran-NotificationAreaInfo                                        RAN-NotificationAreaInfo
OPTIONAL, -- Need M
    t380                                                            PeriodicRNAU-TimerValue
OPTIONAL, -- Need R
    nextHopChainingCount                NextHopChainingCount,
    ...
}
PeriodicRNAU-TimerValue ::=         ENUMERATED { min5, min10, min20, min30,
min60, min120, min360, min720}
CellReselectionPriorities ::=       SEQUENCE {
    freqPriority ListEUTRA                                          FreqPriority ListEUTRA
OPTIONAL, -- Need M
```

TABLE 7-continued

```
    freqPriority ListNR                          FreqPriority ListNR
OPTIONAL, -- Need M
    t320                              ENUMERATED {min5, min10, min20,
min30, min60, min120, min180,        OPTIONAL, -- Need R
spare1}
    ...
}
PagingCycle ::=                       ENUMERATED {rf32, rf64, rf128, rf256}
FreqPriorityListEUTRA ::=                        SEQUENCE (SIZE (1..maxFreq)) OF
FreqPriorityEUTRA
FreqPriorityListNR ::=                           SEQUENCE (SIZE (1..maxFreq)) OF
FreqPriorityNR
FreqPriorityEUTRA ::=                 SEQUENCE {
    carrierFreq                          ARFCN-ValueEUTRA,
    cellReselectionPriority           CellReselectionPriority,
    cellReselectionSubPriority                          CellReselectionSubPriority
OPTIONAL -- Need R
}
FreqPriorityNR ::=                    SEQUENCE {
    carrierFreq                          ARFCN-ValueNR,
    cellReselectionPriority           CellReselectionPriority,
    cellReselectionSubPriority                          CellReselectionSubPriority
OPTIONAL -- Need R
}
RAN-NotificationAreaInfo ::=          CHOICE {
    cellList                             PLMN-RAN-AreaCellList,
    ran-AreaConfigList                   PLMN-RAN-AreaConfigList,
    ...
}
PLMN-RAN-AreaCellList ::=             SEQUENCE (SIZE (1..maxPLMNIdentities))
OF PLMN-RAN-AreaCell
PLMN-RAN-AreaCell ::=                 SEQUENCE {
    plmn-Identity                                              PLMN-Identity
OPTIONAL, -- Need S                              SEQUENCE (SIZE (1..32)) OF
    ran-AreaCells
CellIdentity
}
PLMN-RAN-AreaConfigList ::=           SEQUENCE (SIZE (1..maxPLMNIdentities))
OF PLMN-RAN-AreaConfig
PLMN-RAN-AreaConfig ::=               SEQUENCE {
    plmn-Identity                                              PLMN-Identity
OPTIONAL, -- Need S
    ran-Area                                    SEQUENCE (SIZE (1..16)) OF RAN-
AreaConfig
}
RAN-AreaConfig ::=                    SEQUENCE {
    trackingAreaCode                  TrackingAreaCode,
    ran-AreaCodeList                  SEQUENCE (SIZE (1..32)) OF RAN-AreaCode
OPTIONAL -- Need R
}
-- TAG-RRCRELEASE-STOP
-- ASN1STOP
```

Here, FFS whether RejectWaitTimer is included in the RRCRelease message.

Table 8 is an example of RRCRelease field descriptions.

TABLE 8

RRCRelease field descriptions cnType
Indicate that the UE is redirected to EPC or 5GC.
deprioritisationReq
Indicates whether the current frequency or RAT is to be de-prioritised. The UE shall be able to store a deprioritisation request for up to X frequencies (applicable when receiving another frequency specific deprioritisation request before T325 expiry).
deprioritisation Timer
Indicates the period for which either the current carrier frequency or NR is deprioritised. Value minN corresponds to N minutes.
suspendConfig
Indicates configuration for the RRC_INACTIVE state.
t380
Refers to the timer that triggers the periodic RNAU procedure in UE. Value min5 corresponds to 5 minutes, value min10 corresponds to 10 minutes and so on.
ran-PagingCycle
Refers to the UE specific cycle for RAN-initiated paging. Value rf32 corresponds to 32 radio frames, rf64 corresponds to 64 radio frames and so on.

TABLE 8-continued

RRCRelease field descriptions redirectedCarrierInfo
Indicates a carrier frequency (downlink for FDD) and is used to redirect the UE to an NR or
an inter-RAT carrier frequency, by means of the cell selection upon leaving
RRC_CONNECTED (see TS 38.304 [20])
selectotherPLMN
Indicates whether the UE should select other PLMN.
CandidatePLMNs
When selectotherPLMN is indicated, this information shows the candidate PLMNs which
support emergency roaming.
This information can further include weighing factor in
selecting target PLMN.

Method 2

If competitor's UEs suddenly flock to any PLMN due to a problem occurring in PLMNs of surrounding competitors, additional network errors and communication failures may occur in the PLMN due to an access and registration request of the suddenly increasing UEs. In particular, if the PLMN (e.g., PLMN A) needs to temporarily provide service to a subscriber of other surrounding network (e.g., communication network B) while providing service to its subscriber (subscriber of communication network A), the PLMN A may preferentially provide service to its subscriber and may provide service to the subscriber of the communication network B within the limit that does not impair the stability of the network of the PLMN A if the PLMN A has free resources.

To this end, in the present disclosure, the base station informs the UE about types of services provided to UEs that are subscribed to other PLMNs or providers, and whether to allow service, and the UE attempts to access other PLMN only when service is allowed to the UE.

In particular, if UEs, in which a disaster occurs in a PLMN to which they subscribe, access other surrounding PLMNs, each base station may indicate, to the UE, whether or not other surrounding PLMNs each support national roaming, or whether or not the respective PLMNs permit the access attempt of the UE.

Hence, if the UE attempts to access a different PLMN (hereinafter, referred to as communication network B for convenience of explanation) from a subscribed PLMN (hereinafter, referred to as communication network A for convenience of explanation) of the UE, the UE that attempts to access other surrounding PLMN due to a disaster occurring in the PLMN, to which the UE subscribes, may first read system information in the communication network B and determine whether or not national roaming or disaster roaming is allowed in the communication network B. If the UE receives, from the base station, that national roaming or disaster roaming has been allowed in the communication network B, or if the UE is informed that communication of the purpose similar to this has been allowed in the communication network B, the UE may attempt to access the communication network B and attempt the camping. Further, if national roaming or disaster roaming or the operation similar to this is not allowed in the communication network B, the UE does not attempt to access the communication network B.

Method 2-1

For example, a base station connected to a surrounding PLMN may send each UE whether or not the base station has allowed the national roaming or disaster roaming attempt of UEs subscribed to other competitor PLMN using the following SIB message. That is, the UE that is indicated to select other surrounding PLMN other than a currently subscribed PLMN may determine whether the access attempt (or disaster roaming attempt) to other PLMN is allowed from other base station connected to other PLMN using the following SIB message.

The SIB message contains information relevant when evaluating if a UE is allowed to access a cell, and defines the scheduling of other system information. It also contains radio resource configuration information that is common for all UEs and barring information applied to the unified access control.

The content of a SIB1 message is as follows.
Signalling radio bearer: N/A
RLC-SAP: TM
Logical channel: BCCH
Direction: Network to UE
Table 9 is an example of the SIB1 message.

TABLE 9

```
-- ASN1START
-- TAG-SIB1-START
SIB1 ::=        SEQUENCE {
  cellSelectionInfo                 SEQUENCE {
    q-RxLevMin                        Q-RxLevMin,
    q-RxLevMinOffset                                    INTEGER (1..8)
OPTIONAL, -- Need R
    q-RxLevMinSUL                                         Q-RxLevMin
OPTIONAL, -- Need R
    q-QualMin                                               Q-QualMin
OPTIONAL, -- Need R
    q-QualMinOffset                                     INTEGER (1..8)
OPTIONAL -- Need R
  }
OPTIONAL, -- Need S
  cellAccessRelatedInfo             CellAccessRelatedInfo,
  connEstFailureControl                              ConnEstFailureControl
OPTIONAL, -- Need R
```

TABLE 9-continued

```
    si-SchedulingInfo                                    SI-SchedulingInfo
OPTIONAL, -- Need R
    servingCellConfigCommon                              ServingCellConfigCommonSIB
OPTIONAL, -- Need R
    ims-Emergency Support                                ENUMERATED {true}
OPTIONAL, -- Need R
    eCallOverIMS-Support                                 ENUMERATED {true}
OPTIONAL, -- Cond Absent
    ue-TimersAndConstants                                UE-TimersAndConstants
OPTIONAL, -- Need R
NationalRoamingAllowed
    uac-BarringInfo                     SEQUENCE {
        uac-BarringForCommon                             UAC-BarringPerCatList
OPTIONAL, -- Need S
        uac-BarringPerPLMN-List                          UAC-BarringPerPLMN-List
OPTIONAL, -- Need S
        uac-BarringInfoSetList              UAC-BarringInfoSetList,
        uac-AccessCategory1-Selection AssistanceInfo CHOICE {
            plmnCommon                                   UAC-AccessCategory1-
SelectionAssistanceInfo,
            individualPLMNList                           SEQUENCE (SIZE
(2..maxPLMN)) OF UAC-AccessCategory1-SelectionAssistanceInfo
        }
OPTIONAL
    }
OPTIONAL, -- Need R
    useFullResumeID                                      ENUMERATED {true}
OPTIONAL, -- Need N
SelectOtherPLMN                                          Boolean
    lateNonCriticalExtension                             OCTET STRING
OPTIONAL,
    nonCriticalExtension                                 SEQUENCE{ }
OPTIONAL
UAC-AccessCategory1-SelectionAssistanceInfo ::=    ENUMERATED {a, b, c}
-- TAG-SIB1-STOP
-- ASN1STOP
```

Table 10 is an example of SIB1 field descriptions.

TABLE 10

SIB1 field descriptions q-QualMin
Parameter "$Q_{qualmin}$" in TS 38.304 [20], applicable for serving cell. If the field is not present, the UE applies the (default) value of negative infinity for $Q_{qualmin}$.
q-QualMinOffset
Parameter "$Q_{qualminoffset}$" in TS 38.304 [20]. Actual value $Q_{qualminoffset}$ = field value [dB]. If cellSelectionInfo is not present or the field is not present, the UE applies the (default) value of 0 dB for $Q_{qualminoffset}$. Affects the minimum required quality level in the cell.
q-RxLevMin
Parameter "$Q_{rxlevmin}$" in TS 38.304 [20], applicable for serving cell.
q-RxLevMinOffset
Parameter "$Q_{rxlevminoffset}$" in TS 38.304 [20]. Actual value $Q_{rxlevminoffset}$ = field value * 2 [dB]. If absent, the UE applies the (default) value of 0 dB for $Q_{rxlevminoffset}$. Affects the minimum required Rx level in the cell.
q-RxLevMinSUL
Parameter "$Q_{rxlevminSUL}$" in TS 38.304 [4], applicable for serving cell
uac-BarringForCommon
Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behaviour upon absence of this field is specified in section 5.3.14.2.
useFullResumeID
Indicates which resume identifier and Resume request message should be used. UE uses full I-RNTI and RRCResumeRequest1 if the field is present, or short I-RNTI and RRCResume Request if the field is absent.
uac-AccessCategory 1-SelectionAssistanceInfo
Information used to determine whether Access Category 1 applies to the UE, as defined in [25]. A UE compliant with this version of the specification shall ignore this field.
NationalRoamingAllowed
Indicates whether current network access from national roaming UEs.

An example of the UE's operation in the above method is the same as the following Table 11.

TABLE 11

TS 38.304
The UE shall scan all RF channels in the NR bands according to its capabilities to find available PLMNs. On each carrier, the UE shall search for the strongest cell and read its system information, in order to find out which PLMN(s) the cell belongs to. If the UE can read one or several PLMN identities in the strongest cell, each found PLMN (see the PLMN reading in TS 38.331 [3]) shall be reported to the NAS as a high quality PLMN (but without the RSRP value), provided that the following high-quality criterion is fulfilled:
1. For an NR cell, the measured RSRP value shall be greater than or equal to −110 dBm.
Found PLMNs that do not satisfy the high-quality criterion but for which the UE has been able to read the PLMN identities are reported to the NAS together with their corresponding RSRP values. The quality measure reported by the UE to NAS shall be the same for each PLMN found in one cell.
The search for PLMNs may be stopped on request from the NAS. The UE may optimise PLMN search by using stored information e.g. frequencies and optionally also information on cell parameters from previously received measurement control information elements.
Once the UE has selected a PLMN, the cell selection procedure shall be performed in order to select a suitable cell of that PLMN to camp on.
When the UE are searching for a PLMN triggered by e.g. due to unavailability or HPLMN, due to trigger to start national roaming/emergency roaming, the UE check whether the found PLMN allows national/emergency roaming or not. If the found PLMN and the HPLMN of the UE belongs to same country, and if the found PLMN support national/emergency roaming the UE selects the PLMN. Otherwise, the UE shall not select the PLMN except when there are no other candidate PLMNs.
In case, PLMN of different country than the HPLMN of the UE is available, the UE shall not select PLMN of same country.
After that, the UE start registration.

That is, in a situation in which national roaming is possible (i.e., PLMN of the same country as HPLMN to which the UE subscribes), the UE may attempt the access/camping/registration to the corresponding PLMN only if the PLMN of the same country allows national roaming or disaster roaming.

If the found PLMN does not allow national roaming or disaster roaming, the UE may attempt selection for other PLMN other than the corresponding PLMN. If there is no PLMN that the UE can newly select, the UE perform the camping for receiving a limited service within a cell in which the UE is located currently.

Method 2-1-1

In addition, in the method 2-1, a base station that informs an external UE that national roaming is allowed may inform the UE of conditions for a PLMN to which the corresponding UE subscribes.

For example, in the above example, when a communication network B and a communication network C are around a communication network A, and when national roaming is pre-configured only between the communication network A and the communication network B and national roaming is not configured between the remaining networks, a UE subscribed to the communication network A may receive national roaming service in the communication network B, but cannot receive national roaming service in the communication network C.

If any disaster does not occur in the communication network C, a UE subscribed to the communication network C shall not attempt to access the communication network B even if the communication network B supports national roaming.

Accordingly, the communication network B supports national roaming for a subscriber of the communication network A, and shall be able to block national roaming for a subscriber of the communication network C.

To this end, if national roaming for a PLMN connected to the base station is allowed to the UE, the base station may transmit, to the UE, a PLMN condition for whether national roaming is allowed for any PLMN (communication network). When the UE itself shall perform national roaming, the UE monitors the PLMN condition in the candidate PLMN list based on the PLMN condition and attempts to access only a PLMN allowed in a home PLMN to which the UE is subscribed. If the home PLMN of the UE is not included, the UE does not attempt to access the PLMN.

The SIB1 message in the above example contains information relevant when evaluating if a UE is allowed to access a cell and defines the scheduling of other system information. It also contains radio resource configuration information that is common for all UEs and barring information applied to the unified access control.

Signalling radio bearer: N/A
RLC-SAP: TM
Logical channel: BCCH
Direction: Network to UE Table 12 is an example of the SIB1 message according to the method 2-1-1.

TABLE 12

```
-- ASN1START
-- TAG-SIB1-START
SIB1 ::=       SEQUENCE {
    cellSelectionInfo                       SEQUENCE {
        q-RxLevMin                              Q-RxLevMin,
        q-RxLevMinOffset                            INTEGER (1..8)
    OPTIONAL, -- Need R
        q-RxLevMinSUL                                   Q-RxLevMin
```

TABLE 12-continued

```
    OPTIONAL, -- Need R
        q-QualMin                                    Q-QualMin
    OPTIONAL, -- Need R
        q-QualMinOffset                              INTEGER (1..8)
    OPTIONAL -- Need R
    }
OPTIONAL, -- Need S
    cellAccessRelatedInfo                        CellAccessRelatedInfo,
    connEstFailureControl                        ConnEstFailureControl
OPTIONAL, -- Need R
    si-SchedulingInfo                            SI-SchedulingInfo
OPTIONAL, -- Need R
    servingCellConfigCommon                      ServingCellConfigCommonSIB
OPTIONAL, -- Need R
    ims-Emergency Support                        ENUMERATED {true}
OPTIONAL, -- Need R
    eCallOverIMS-Support                         ENUMERATED {true}
OPTIONAL, -- Cond Absent
    ue-TimersAndConstants                        UE-TimersAndConstants
OPTIONAL, -- Need R
NationalRoamingAllowed
AllowedPLMNforNationalRoaming
    uac-BarringInfo                              SEQUENCE {
        uac-BarringForCommon                         UAC-BarringPerCatList
    OPTIONAL, -- Need S
        uac-BarringPerPLMN-List                      UAC-BarringPerPLMN-List
    OPTIONAL, -- Need S
        uac-BarringInfoSetList,                      UAC-BarringInfoSetList,
        uac-AccessCategory 1-Selection AssistanceInfo CHOICE {
            plmnCommon                                   UAC-AccessCategory1-
SelectionAssistanceInfo,
            individualPLMNList                           SEQUENCE (SIZE
(2..maxPLMN)) OF UAC-AccessCategory 1-SelectionAssistanceInfo
        }
OPTIONAL
    }
OPTIONAL, -- Need R
    useFullResumeID                              ENUMERATED {true}
OPTIONAL, -- Need N
SelectOtherPLMN                                  Boolean
    lateNonCriticalExtension                     OCTET STRING
OPTIONAL,
    nonCriticalExtension                         SEQUENCE{ }
OPTIONAL
}
UAC-AccessCategory 1-Selection AssistanceInfo ::=   ENUMERATED {a, b, c}
-- TAG-SIB1-STOP
-- ASN1STOP
```

Table 13 is an example of SIB1 field descriptions according to the method 2-1-1.

TABLE 13

SIB1 field descriptions q-QualMin
Parameter "$Q_{qualmin}$" in TS 38.304 [20], applicable for serving cell. If the field is not present, the UE applies the (default) value of negative infinity for $Q_{qualmin}$.
q-QualMinOffset
Parameter "$Q_{qualminoffset}$" in TS 38.304 [20]. Actual value $Q_{qualminoffset}$ = field value [dB]. If cellSelectionInfo is not present or the field is not present, the UE applies the (default) value of 0 dB for $Q_{qualminoffset}$. Affects the minimum required quality level in the cell.
q-RxLevMin
Parameter "$Q_{rxlevmin}$" in TS 38.304 [20], applicable for serving cell..
q-RxLevMinOffset
Parameter "$Q_{rxlevminoffset}$" in TS 38.304 [20]. Actual value $Q_{rxlevminoffset}$ = field value * 2 [dB]. If absent, the UE applies the (default) value of 0 dB for Qrxlevminoffset.
Affects the minimum required Rx level in the cell.
q-RxLevMinSUL
Parameter "$Q_{rxlevminSUL}$" in TS 38.304 [4], applicable for serving cell
uac-BarringForCommon
Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behaviour upon absence of this field is specified in section 5.3.14.2.

TABLE 13-continued

SIB1 field descriptions useFullResumeID
Indicates which resume identifier and Resume request message should be used. UE uses
full I-RNTI and RRCResumeRequest1 if the field is present, or short I-RNTI and
RRCResume Request if the field is absent.
uac-AccessCategory 1-SelectionAssistanceInfo
Information used to determine whether Access Category 1 applies to the UE, as defined in
[25]. A UE compliant with this version of the specification shall ignore this field.
NationalRoamingAllowed
Indicates whether current network access from national roaming UEs.
AllowedPLMNforNationalRoaming
The list of PLMN whose subscribed are allowed for national roaming.

Method 2-2

For services that generate a lot of traffic and are important in daily life, such as services used by general smartphones, a UE shall get services on a new PLMN via national roaming or disaster roaming, but a UE of the purpose such as IoT (e.g., a UE that performs gas/electricity measurement once a month and transmits a result of the measurement) does not need to immediately move to a new PLMN or to perform roaming on a new PLMN.

Accordingly, the above operations are performed on only a UE, for which national roaming or disaster roaming is allowed, based on information configured in, for example, a SIM or a memory of the UE, and are not performed on a UE if which national roaming or disaster roaming is not allowed based on configuration information, etc.

Method 2-3

If a UE has accessed other network (network B or PLMN B) since a problem occurs in a network (network A or PLMN A) subscribed by the UE and thus the network A can no longer be used, and the network B has not yet recognized that the problem has occurred in the network A, the UE camps on the network B in a limited mode. In this case, the UE continues to monitor a SIB message in the network B.

In the above process, whether to support national roaming may be indicated to the UE through a method listed in the above methods in the SIB message received by the UE. In this process, a base station may inform the UE that the access has been allowed for UEs of which PLMN.

That is, if in the above scenario, the UE has attempted the access by the network B and receives a registration reject (attach reject) by the network B, the UE may configure the network B as a forbidden PLMN.

However, if the UE receives, from the subsequent SIB, information notifying that national roaming or disaster roaming has been allowed on the network B or that the forbidden PLMN has been released, the UE may release the PLMN B from the forbidden PLMN configuration if the UE corresponds to this (i.e., subscription to the network A). Hence, the UE attempts to register again to the PLMN B.

Method 2-3-1

Preferably, in the above situation, in a state where any UE camps on a base station belonging to a specific network, a PLMN of the corresponding network is configured as the forbidden PLMN and the UE accesses the corresponding PLMN in a limited service state. And, if the SIB that the base station transmits to the UE is updated, and it is indicated that the PLMN belongs to home PLMN of the UE, the UE may perform newly the registration procedure to the corresponding PLMN, and the UE may get out of the limited service state if it is successful.

Method 2-3-1-1

Method 2-3-1-1 is an example of the method 2-3-1, and Table 14 represents an example of the method 2-3-1-1.

TABLE 14

4.4.3 PLMN Selection

The registration on the selected PLMN and the location registration are only necessary if
the MS is capable of services which require registration. Otherwise, the PLMN selection
procedures are performed without registration.
The ME shall utilize all the information stored in the SIM related to the PLMN selection;
e.g. "HPLMN Selector with Access Technology", "Operator controlled PLMN Selector
with Access Technology", "User Controlled PLMN Selector with Access Technology",
"Forbidden PLMNs", "Equivalent HPLMN".
The "HPLMN Selector with Access Technology", "User Controlled PLMN Selector with
Access Technology" and "Operator Controlled PLMN Selector with Access Technology"
data files in the SIM include associated access technologies for each PLMN entry, see
3GPP TS 31.102 [40]. The PLMN/access technology combinations are listed in priority
order. If an entry indicates more than one access technology, then no priority is defined for
the access technologies within this entry and the priority applied to each access technology
within this entry is an implementation issue. If no particular access technology is indicated
in an entry, it shall be assumed that all access technologies supported by the ME apply to
the entry. If an entry only indicates access technologies not supported by the ME, the entry
shall be ignored. If an entry indicates at least one access technology supported by the ME,
the entry shall be used in the PLMN selection procedures if the other criteria defined for the
specific PLMN selection procedures are fulfilled.
The Mobile Equipment stores a list of "equivalent PLMNs". This list is replaced or deleted
at the end of each location update procedure, routing area update procedure, GPRS attach
procedure, tracking area update procedure, EPS attach procedure, and registration
procedure. The list is deleted by an MS attached for emergency bearer services after detach
or registered for emergency services after deregistration. The stored list consists of a list of
equivalent PLMNs as downloaded by the network plus the PLMN code of the registered
PLMN that downloaded the list. All PLMNs in the stored list, in all access technologies TABLE 14-continued

| 4.4.3 PLMN Selection |
|---|
| supported by the PLMN, are regarded as equivalent to each other for PLMN selection, cell selection/re-selection and handover.<br>When the MS reselects to a cell in a shared network, and the cell is a suitable cell for multiple PLMN identities received on the BCCH or on the EC-BCCH the AS indicates these multiple PLMN identities to the NAS according to 3GPP TS 44.018 [34], 3GPP TS 44.060 [39], 3GPP TS 25.304 [32] and 3GPP TS 36.304 [43]. The MS shall choose one of these PLMNs. If the registered PLMN is available among these PLMNs, the MS shall not choose a different PLMN.<br>When a cell is updated to support multiple network (e.g. a cell becomes to be part of a shared network), and the cell is a suitable cell for multiple PLMN identities received on the BCCH or on the EC-BCCH the AS indicates these multiple PLMN identities to the NAS according to 3GPP TS 44.018 [34], 3GPP TS 44.060 [39], 3GPP TS 25.304 [32] and 3GPP TS 36.304 [43]. The MS shall choose one of these PLMNs.<br>When a system information of a cell is updated and PLMN identities received on the BCCH or on the EC-BCCH is updated, the AS indicates these multiple PLMN identities to the NAS according to 3GPP TS 44.018 [34], 3GPP TS 44.060 [39], 3GPP TS 25.304 [32] and 3GPP TS 36.304 [43]. The MS shall choose one of these PLMNs. If HPLMN is included in the multiple PLMN and if the UE is in limited state or if the UE is registered in VPLMN, then the UE start registration with HPLMN is selected.<br>The MS shall not use the PLMN codes contained in the "HPLMN Selector with Access Technology" data file.<br>It is possible for the home network operator to identify alternative Network IDs as the HPLMN. If the EHPLMN list is present, and not empty, the entries in the EHPLMN list are used in the network selection procedures. When attempting to select a network the highest priority EHPLMN that is available shall be selected. If the EHPLMN list is present and is empty or if the EHPLMN list is not present, the HPLMN derived from the IMSI is used for network selection procedures. |

In the above, the UE is located in the same cell, but the same cell may additionally broadcast other PLMN according to the disaster situation. In this case, if SIB in a cell, in which RRC of the UE is located, is updated and a new PLMN is newly supported in the cell, the UE informs the upper layers of the corresponding content. For example, the NAS layer shall know that Home PLMN of the NAS layer is supported in the current cell, and shall properly allow the UE to attempt again the attach attempt or the registration request operation.

Table 15 illustrates the registration operation.

TABLE 15

| 5.2.2.7 Actions upon reception of SystemInformationBlockType1 message |
|---|
| Upon receiving the SystemInformationBlockType1 or SystemInformationBlockType1-BR either via broadcast or via dedicated signalling, the UE shall:<br>1> if the upper layers indicate the selected core network type as 5GC:<br>2> if the cellAccessRelatedInfoList-5GC contains an entry with the plmn-Identity or plmn-Index of the selected PLMN:<br>3> in the remainder of the procedures use plmn-Identity List, trackingAreaCode, and cellIdentity for the cell as received in the corresponding cellAccessRelatedInfoList-5GC containing the selected PLMN.<br>1> else if the cellAccessRelatedInfoList contains an entry with the PLMN-Identity of the selected PLMN:<br>2> in the remainder of the procedures use plmn-Identity List, trackingAreaCode, and cellIdentity for the cell as received in the corresponding cellAccessRelatedInfoList containing the selected PLMN.<br>1> if in RRC_IDLE or in RRC_CONNECTED while T311 is running;<br>1> if the UE is a category 0 UE according to TS 36.306 [5];<br>1> if category0Allowed is not included in SystemInformationBlockType1:<br>2> consider the cell as barred in accordance with TS 36.304 [4].<br>1> if in RRC_CONNECTED while T311 is not running, and the UE supports multi-band cells as defined by bit 31 in featureGroupIndicators:<br>2> disregard the freqBandIndicator and multiBandInfoList, if received, while in RRC_CONNECTED.<br>2> forward the cellIdentity to upper layers.<br>2> forward the trackingAreaCode to upper layers.<br>2> if the received SystemInformationBlockType1 includes plmn-Identity List different from the last plmn-Identity List delivered to upper layer;<br>2> or if this is the first received SystemInformationBlockType1 after upper layer requested information available PLMNs<br>2> or if the SystemInformationBlockType1 of the current cell is updated to include HPLMN ID<br>2> or if the SystemInformationBlockType1 of the current cell is updated to not include HPLMN ID |

TABLE 15-continued 5.2.2.7 Actions upon reception of SystemInformationBlockType1 message 3> forward the plmn-IdentityList to upper layers.
1> else:
2> if the frequency band indicated in the freqBandIndicator is part of the frequency bands
supported by the UE and it is not a downlink only band; or
2> if the UE supports multiBandInfoList, and if one or more of the frequency bands
indicated in the multiBandInfoList are part of the frequency bands supported by the UE and
they are not downlink only bands:
3> forward the cellIdentity to upper layers.
3> forward the trackingAreaCode to upper layers;
3> forward the ims-EmergencySupport to upper layers, if present;
3> forward the eCallOverIMS-Support to upper layers, if present;
3> if the received SystemInformationBlockType1 includes plmn-Identity List different from
the last plmn-Identity List delivered to upper layer;
3> or if this is the first received SystemInformationBlockType1 after upper layer requested
information available PLMNs
3> or if the SystemInformationBlockType1 of the current cell is updated to include HPLMN
ID
3> or if the SystemInformationBlockType1 of the current cell is updated to not include
HPLMN ID
4> forward the plmn-IdentityList to upper layers.
3> if the UE is capable of 5G NAS:
4> forward the ims-EmergencySupport-5GC to upper layers, if present;
4> forward the eCallOverIMS-Support-5GC to upper layers, if present;
3> if, for the frequency band selected by the UE (from freqBandIndicator or
multiBandInfoList), the freqBandInfo or the multiBandInfoList-v10j0 is present and the UE
capable of multiNS-Pmax supports at least one additionalSpectrumEmission in the NS-
PmaxList within the freqBandInfo or multiBandInfoList-v10j0:
4> apply the first listed additionalSpectrumEmission which it supports among the values
included in NS-PmaxList within freqBandInfo or multiBandInfolist-v10j0.
4> if the additionalPmax is present in the same entry of the selected
additionalSpectrumEmission within NS-PmaxList:
5> apply the additionalPmax.
4> else:
5> apply the p-Max .
3> else:
4> apply the additionalSpectrumEmission in SystemInformationBlockType2 and the p-
Max.
2> else:
3> consider the cell as barred in accordance with TS 36.304 [4].
3> perform barring as if intraFreqReselection is set to notAllowed, and as if the csg-
Indication is set to FALSE;
1> if in RRC_INACTIVE:
2> if the cell does not belong to the RAN notification area configured by RAN-
NotificationAreaInfo:
3> initiate the RAN notification area update procedure as specified in 5.3.17.
Upon receiving the SystemInformationBlockType1-NB, the UE shall:
1> if the frequency band indicated in the freqBandIndicator is part of the frequency bands
supported by the UE; or
1> if one or more of the frequency bands indicated in the multiBandInfoList are part of the
frequency bands supported by the UE:
2> forward the cellIdentity to upper layers.
2> forward the trackingAreaCode to upper layers.
2> if the received SystemInformationBlockType1 includes plmn-Identity List different from
the last plmn-Identity List delivered to upper layer,
2> or if this is the first received SystemInformationBlockType1 after upper layer requested
information available PLMNs
2> or if the SystemInformationBlockType1 of the current cell is updated to include HPLMN
ID
2> or if the SystemInformationBlockType1 of the current cell is updated to not include
HPLMN ID
3> forward the plmn-IdentityList to upper layers.
2> if attach WithoutPDN-Connectivity is received for the selected PLMN:
3> forward the attach WithoutPDN-Connectivity to upper layers.
2>else
3> indicate to upper layers that attach WithoutPDN-Connectivity is not present.
2> if, for the frequency band selected by the UE (from freqBandIndicator or
multiBandInfoList), the freqBandInfo is present and the UE capable of multiNS-Pmax
supports at least one additionalSpectrumEmission in the NS-PmaxList within the
freqBandInfo:
3> apply the first listed additionalSpectrumEmission which it supports among the values
included in NS-PmaxList within freqBandInfo.
3> if the additionalPmax is present in the same entry of the selected
additional SpectrumEmission within NS-PmaxList:
4> apply the additionalPmax.
3> else:
4> apply the p-Max.

TABLE 15-continued 5.2.2.7 Actions upon reception of SystemInformationBlockType1 message 2> else:
3> apply the additionalSpectrumEmission in SystemInformationBlockType2-NB and the p-Max.
1> else:
2> consider the cell as barred in accordance with TS 36.304 [4].
2> perform barring as if intraFreqReselection is set to notAllowed.
No UE requirements related to the contents of SystemInformationBlockType1-MBMS apply other than those specified elsewhere e.g. within procedures using the concerned system information, and/ or within the corresponding field descriptions.

Method 3

Even if a UE is additionally informed that national roaming is allowed in a certain network, a problem still occurs in a new network if a large number of UEs suddenly attempt to access the certain network at once. In particular, for a UE that directly subscribes service to the certain network, and a UE that temporarily performs the access to the certain network from other competitor's network, the certain network needs to selectively control the access of the UE that temporarily performs the access, i.e., perform national roaming.

Accordingly, the present disclosure is to propose a method for performing the access control for national roaming in order to achieve this.

Method 3-1

A base station can control the access for a UE attempting national roaming or disaster roaming using an access identity.

For example, the base station can efficiently control the UE's access as above by extending the access identity as follows and can adjust a load of a system. That is, if the UE attempts to access a new PLMN, the UE may transmit the following access identity to a new network (base station/PLMN).

Table 16 illustrates the access identity.

TABLE 16

| Access Identity Number | UE Configuration |
|---|---|
| 0 | UE is not configured with any parameters from this table. |
| 1 (NOTE 1) | UE is configured for Multimedia Priority Service (MPS). |
| 2 (NOTE 2) | UE is configured for Mission Critical Service (MCS). |
| 4 (NOTE 4) | UE trying for national/emergency roaming |
| 4-10 | Reserved for future use |

TABLE 16-continued

| Access Identity Number | UE Configuration |
|---|---|
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access Identity 1 is used by UEs configured for MPS, in the PLMNs where the configuration is valid. The PLMNs where the configuration is valid are HPLMN, PLMNs equivalent to HPLMN, and visited PLMNs of the home country. Access Identity 1 is also valid when the UE is explicitly authorized by the network based on specific configured PLMNs inside and outside the home country.
NOTE 2:
Access Identity 2 is used by UEs configured for MCS, in the PLMNs where the configuration is valid. The PLMNs where the configuration is valid are HPLMN or PLMNs equivalent to HPLMN and visited PLMNs of the home country. Access Identity 2 is also valid when the UE is explicitly authorized by the network based on specific configured PLMNs inside and outside the home country.
NOTE 3:
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.
NOTE 4:
Access Identity 4 is used for a UE which is accessing a PLMN of same home country as HPLMN. For this purpose the home country is defined as the country of the MCC part of the IMSI.

The number of access IDs may be limited at once.

In the example, the access identity 4 is an example and may be designated with other value. That is, when the UE attempts to access a specific PLMN, if a PLMN that the UE attempts to access is a PLMN of the same country as a HPLMN of the UE and does not correspond to the access identities 11 to 15 and the access identity 1/2, the UE can check whether its access is barred using the access identity 4. As a result, if the access is allowed, the UE enters a next step for actual RRC connection or NAS signalling or data transmission.

In the above process, the UE does not use the access identity 4 for other PLMNs.

Method 3-2

Table 17 represents an example using an access category.

TABLE 17

| Access Category Number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling on NAS level resulting from other than paging |

TABLE 17-continued

| Access Category Number | Conditions related to UE | Type of access attempt |
|---|---|---|
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1. | MO signalling on RRC level resulting from other than paging |
| 9 | A UE is accessing a PLMN of same home country but not HPLMN. | All except for emergency |
| 10-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN. When a UE is configured for EAB, the UE is also configured for delay tolerant service. In case a UE is configured both for EAB and for EAB override, when upper layer indicates to override Access Category 1, then Access Category 1 is not applicable.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
NOTE 3:
Includes Real-Time Text (RTT).
NOTE 4:
Includes IMS Messaging.

Access Category 0 shall not be barred irrespective of access identities.

NOTE: the network can control the amount of access attempts relating to Access Category 0 by controlling whether to send paging or not.

That is, the example shows that the UE selects an access category specifically designated for national roaming or disaster roaming in the access categories, and then checks whether there is access barring using the selected access category. In other words, when any UE cannot perform the access due to a problem occurring in a HPLMN of the UE, but when the UE can use other network of the same home country, and when the UE shall access a network, the UE selects the access category and performs the access.

Method 3-3

As another method according to the present disclosure, this method configures a value for national roaming in ACB, informs a UE of it via a SIB2 message, and allows a UE to operate based on this.

Table 18 illustrates SIB2 information elements of the example.

TABLE 18

```
-- ASN1START
SystemInformationBlockType2 ::=           SEQUENCE {
    ac-BarringInfo                                    SEQUENCE {
        ac-BarringForEmergency                            BOOLEAN,
        ac-BarringForMO-Signalling                        AC-BarringConfig
            OPTIONAL,        -- Need OP
        ac-BarringForMO-Data                              AC-BarringConfig
            OPTIONAL         -- Need OP
    }
                                                      OPTIONAL,   -- Need OP
    radioResourceConfigCommon
    RadioResourceConfigCommonSIB,
    ue-TimersAndConstants                         UE-TimersAndConstants,
    freqInfo                                          SEQUENCE {
        ul-CarrierFreq                                    ARFCN-
ValueEUTRA                                    OPTIONAL,  -- Need OP
        ul-Bandwidth                                      ENUMERATED
{n6, n15, n25, n50, n75, n100}
                                                      OPTIONAL,  -- Need
OP
        additionalSpectrumEmission
```

TABLE 18-continued

```
            AdditionalSpectrumEmission
        },
        mbsfn-SubframeConfigList                    MBSFN-SubframeConfigList
                OPTIONAL,        -- Need OR
        timeAlignmentTimerCommon                    TimeAlignmentTimer,
        ...,
        lateNonCriticalExtension          OCTET      STRING       (CONTAINING
SystemInformationBlockType2-v8h0-IEs)
        OPTIONAL,
        [[      ssac-BarringForMMTEL-Voice-r9               AC-BarringConfig
                OPTIONAL,       -- Need OP
                ssac-BarringForMMTEL-Video-r9               AC-BarringConfig
                OPTIONAL        -- Need OP
        ]],
        [[      ac-BarringForCSFB-r10                       AC-BarringConfig
                OPTIONAL        -- Need OP
        ]],
        [[      ac-BarringSkipForMMTELVoice-r12             ENUMERATED {true}
                OPTIONAL,       -- Need OP
                ac-BarringSkipForMMTELVideo-r12             ENUMERATED {true}
                OPTIONAL,       -- Need OP
                ac-BarringSkipForSMS-r12                    ENUMERATED {true}
                OPTIONAL,       -- Need OP
                ac-BarringPerPLMN-List-r12                  AC-BarringPerPLMN-
List-r12 OPTIONAL       -- Need OP
            ac-BarringPerNationalRoaming
        ]],
        [[      voiceServiceCauseIndication-r12             ENUMERATED {true}
        OPTIONAL        -- Need OP
        ]],
        [[      acdc-BarringForCommon-r13                   ACDC-
BarringForCommon-r13           OPTIONAL,       -- Need OP
                acdc-BarringPerPLMN-List-r13                ACDC-BarringPerPLMN-List-r13
        OPTIONAL        -- Need OP
        ]],
        [[
                udt-RestrictingForCommon-r13                UDT-Restricting-r13
                OPTIONAL,       -- Need OR
                udt-RestrictingPerPLMN-List-r13             UDT-
RestrictingPerPLMN-List-r13    OPTIONAL,       -- Need OR
                cIoT-EPS-OptimisationInfo-r13               CIOT-EPS-OptimisationInfo-r13
        OPTIONAL,       -- Need OP
                useFullResumeID-r13                                 ENUMERATED
{true}           OPTIONAL        -- Need OP
        ]],
        [[      unicastFreqHoppingInd-r13                   ENUMERATED {true}
                OPTIONAL        -- Need OP
        ]],
        [[      mbsfn-SubframeConfigList-v1430              MBSFN-
SubframeConfigList-v1430        OPTIONAL,       -- Need OP
                videoServiceCauseIndication-r14             ENUMERATED {true}
                OPTIONAL        -- Need OP
        ]],
        [[      plmn-InfoList-r15                                   PLMN-InfoList-
r15                     OPTIONAL        -- Need OP
        ]],
        [[      cp-EDT-r15
                ENUMERATED {true}               OPTIONAL,       -- Need OR
                up-EDT-r15
                ENUMERATED {true}               OPTIONAL,       -- Need OR
                idleModeMeasurements-r15                    ENUMERATED {true}
                OPTIONAL,       -- Need OR
                reducedCP-Latency Enabled-r15               ENUMERATED {true}
                OPTIONAL        -- Need OR
        ]]
}
SystemInformationBlockType2-v8h0-IEs ::=        SEQUENCE {
        multiBandInfoList                       SEQUENCE                        (SIZE
(1..maxMultiBands)) OF AdditionalSpectrumEmission       OPTIONAL, -- Need OR
        nonCriticalExtension                    SystemInformationBlockType2-v9e0-IEs
        OPTIONAL
}
SystemInformationBlockType2-v9e0-IEs ::= SEQUENCE {
        ul-CarrierFreq-v9e0                             ARFCN-ValueEUTRA-
v9e0            OPTIONAL,       -- Cond ul-FreqMax
        nonCriticalExtension                    SystemInformationBlockType2-
v910-IEs                                OPTIONAL
}
SystemInformationBlockType2-v910-IEs ::= SEQUENCE {
-- Following field is for any non-critical extensions from REL-9
```

TABLE 18-continued

```
        nonCriticalExtension              OCTET    STRING      (CONTAINING
SystemInformationBlockType2-v10m0-IEs)
        OPTIONAL,
        dummy           SEQUENCE { }      OPTIONAL
}
SystemInformationBlockType2-v10m0-IEs ::= SEQUENCE {
        freqInfo-v10l0                                SEQUENCE {
            additionalSpectrumEmission-v10l0
        AdditionalSpectrumEmission-v10l0
        }
                                          OPTIONAL,
        multiBandInfoList-v10l0                       SEQUENCE            (SIZE
(1..maxMultiBands)) OF
                           AdditionalSpectrumEmission-v10l0
        OPTIONAL,
-- Following field is for non-critical extensions from REL-10
        nonCriticalExtension              SEQUENCE { }
            OPTIONAL
}
AC-BarringConfig ::=                      SEQUENCE {
        ac-BarringFactor                      ENUMERATED {
        p00, p05, p10, p15, p20, p25, p30, p40,
        p50, p60, p70, p75, p80, p85, p90, p95},
        ac-BarringTime                    ENUMERATED {s4, s8,
s16, s32, s64, s128, s256, s512},
        ac-BarringForSpecialAC            BIT STRING (SIZE(5))
}
MBSFN-SubframeConfigList ::=      SEQUENCE (SIZE (1..maxMBSFN-Allocations))
OF MBSFN-SubframeConfig
MBSFN-SubframeConfigList-v1430 ::=        SEQUENCE (SIZE (1..maxMBSFN-
Allocations)) OF MBSFN-SubframeConfig-v1430
AC-BarringPerPLMN-List-r12 ::=            SEQUENCE (SIZE (1.. maxPLMN-r11))
OF AC-BarringPerPLMN-r12
AC-BarringPerPLMN-r12 ::=                 SEQUENCE {
        plmn-Identity Index-r12                       INTEGER (1..maxPLMN-
r11),
        ac-BarringInfo-r12                                SEQUENCE {
            ac-BarringForEmergency-r12            BOOLEAN,
            ac-BarringForMO-Signalling-r12        AC-BarringConfig
        OPTIONAL,    -- Need OP
            ac-BarringForMO-Data-r12              AC-BarringConfig
        OPTIONAL    -- Need OP
        }
                                  OPTIONAL,    -- Need OP
        ac-BarringSkipForMMTELVoice-r12           ENUMERATED {true}
        OPTIONAL,    -- Need OP
        ac-BarringSkipForMMTELVideo-r12           ENUMERATED {true}
        OPTIONAL,    -- Need OP
        ac-BarringSkipForSMS-r12                  ENUMERATED {true}
        OPTIONAL,    -- Need OP
        ac-BarringForCSFB-r12                     AC-BarringConfig
        OPTIONAL,    -- Need OP
        ssac-BarringForMMTEL-Voice-r12            AC-BarringConfig
        OPTIONAL,    -- Need OP
        ssac-BarringForMMTEL-Video-r12            AC-BarringConfig
        OPTIONAL    -- Need OP
}
ACDC-BarringForCommon-r13 ::=             SEQUENCE {
        acdc-HPLMNonly-r13                        BOOLEAN,
        barringPerACDC-CategoryList-r13               BarringPerACDC-
CategoryList-r13
}
ACDC-BarringPerPLMN-List-r13 ::=          SEQUENCE (SIZE (1.. maxPLMN-r11))
OF ACDC-BarringPerPLMN-r13
ACDC-BarringPerPLMN-r13 ::=               SEQUENCE {
        plmn-IdentityIndex-r13            INTEGER (1..maxPLMN-r11),
        acdc-OnlyForHPLMN-r13                         BOOLEAN,
        barringPerACDC-CategoryList-r13               BarringPerACDC-
CategoryList-r13
}
BarringPerACDC-CategoryList-r13 ::= SEQUENCE (SIZE (1..maxACDC-Cat-r13)) OF
BarringPerACDC-Category-r13
BarringPerACDC-Category-r13 ::= SEQUENCE {
        acdc-Category-r13                 INTEGER     (1..maxACDC-Cat-
r13),
        acdc-BarringConfig-r13            SEQUENCE {
            ac-BarringFactor-r13              ENUMERATED {
        p00, p05, p10, p15, p20, p25, p30, p40,
        p50, p60, p70, p75, p80, p85, p90, p95},
            ac-BarringTime-r13                        ENUMERATED {s4, s8,
```

TABLE 18-continued

```
s16, s32, s64, s128, s256, s512}
        }
        OPTIONAL        -- Need OP
}
UDT-Restricting-r13 ::=    SEQUENCE {
        udt-Restricting-r13                             ENUMERATED {true}
                OPTIONAL, -- Need OR
        udt-RestrictingTime-r13                         ENUMERATED {s4, s8, s16, s32,
s64, s128, s256, s512} OPTIONAL -- Need OR
}
UDT-RestrictingPerPLMN-List-r13 ::=      SEQUENCE (SIZE (1..maxPLMN-r11)) OF UDT-
RestrictingPerPLMN-r13
UDT-RestrictingPerPLMN-r13 ::= SEQUENCE {
        plmn-IdentityIndex-r13                          INTEGER (1..maxPLMN-
r11),
        udt-Restricting-r13                             UDT-Restricting-
r13         OPTIONAL    -- Need OR
}
CIOT-EPS-OptimisationInfo-r13 ::=        SEQUENCE (SIZE (1.. maxPLMN-r11)) OF
CIOT-OptimisationPLMN-r13
CIOT-OptimisationPLMN-r13 ::= SEQUENCE {
                up-CIoT-EPS-Optimisation-r13            ENUMERATED {true}
        OPTIONAL,       -- Need OP
                cp-CIoT-EPS-Optimisation-r13            ENUMERATED {true}
        OPTIONAL,       -- Need OP
                attach WithoutPDN-Connectivity-r13      ENUMERATED {true}
        OPTIONAL        -- Need OP
}
PLMN-InfoList-r15 ::=                            SEQUENCE (SIZE (1..maxPLMN-r11))
OF PLMN-Info-r15
PLMN-Info-r15 ::=                        SEQUENCE {
        upperLayerIndication-r15                        ENUMERATED {true}
        OPTIONAL                -- Need OR
}
-- ASN1STOP
```

Table 19 is an example of SIB2 field descriptions.

TABLE 19

SystemInformationBlockType2 field descriptions ac-BarringFactor
If the random number drawn by the UE is lower than this value, access is allowed.
Otherwise the access is barred. The values are interpreted in the range [0,1): p00 = 0, p05 =
0.05, p10 = 0.10, . . . , p95 = 0.95. Values other than p00 can only be set if all bits of the
corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for
AC 12, and so on.
ac-BarringPerNationalRoaming
Access Class barring parameter for the UE performing national/emergency roaming.
ac-BarringTime
Mean access barring time value in seconds.
acdc-BarringConfig
Barring configuration for an ACDC category. If the field is absent, access to the cell is
considered as not barred for the ACDC category in accordance with subclause 5.3.3.13.
acdc-Category
Indicates the ACDC category as defined in TS 24.105 [72].
acdc-OnlyForHPLMN
Indicates whether ACDC is applicable for UEs not in their HPLMN for the corresponding
PLMN. TRUE indicates that ACDC is applicable only for UEs in their HPLMN for the
corresponding PLMN. FALSE indicates that ACDC is applicable for both UEs in their
HPLMN and UEs not in their HPLMN for the corresponding PLMN.
additional SpectrumEmission
The UE requirements related to IE AdditionalSpectrumEmission are defined in TS 36.101
[42, table 6.2.4-1] for UEs neither in CE nor BL UEs and TS 36.101 [42, table 6.2.4E-1] for
UEs in CE or BL UEs. NOTE 1.
attach WithoutPDN-Connectivity
If present, the field indicates that attach without PDN connectivity as specified in TS 24.301

TABLE 19-continued

SystemInformationBlockType2 field descriptions

[35] is supported for this PLMN.
barringPerACDC-Category List
A list of barring information per ACDC category according to the order defined in TS 22.011 [10]. The first entry in the list corresponds to the highest ACDC category of which applications are the least restricted in access attempts at a cell, the second entry in the list corresponds to the ACDC category of which applications are restricted more than applications of the highest ACDC category in access attempts at a cell, and so on. The last entry in the list corresponds to the lowest ACDC category of which applications are the most restricted in access attempts at a cell.
cIoT-EPS-OptimisationInfo
A list of CIOT EPS related parameters. Value 1 indicates parameters for the PLMN listed 1st in the 1st plmn-IdentityList included in SIB1. Value 2 indicates parameters for the PLMN listed 2nd in the same plmn-IdentityList, or when no more PLMN are present within the same plmn-IdentityList, then the value indicates paramters for PLMN listed 1st in the subsequent plmn-IdentityList within the same SIBI and so on. NOTE 1.
cp-CIoT-EPS-Optimisation
This field indicates if the UE is allowed to establish the connection with Control plane CIoT EPS Optimisation, see TS 24.301 [35].
cp-EDT
This field indicates whether the UE is allowed to initiate CP-EDT, see 5.3.3.1b.
Dummy
This field is not used in the specification. If received it shall be ignored by the UE.
idleModeMeasurements
This field indicates that the eNB can process indication of IDLE mode measurements from UE.
mbsfn-SubframeConfigList
Defines the subframes that are reserved for MBSFN in downlink.
NOTE 1. If the cell is a FeMBMS/Unicast mixed cell, EUTRAN includes mbsfn-Subframe ConfigList-v1430. If a FeMBMS/Unicast mixed cell does not use sub-frames #4 or #9 as MBSFN sub-frames, mbsfn-SubframeConfigList-v1430 is still included and indicates all sub-frames as non-MBSFN sub-frames.
multiBandInfoList
A list of AdditionalSpectrumEmission i.e. one for each additional frequency band included in multiBandInfoList in SystemInformationBlockType1, listed in the same order. If E-UTRAN includes multiBandInfoList-v1010 it includes the same number of entries, and listed in the same order, as in multiBandInfoList.
plmn-Identity Index
SystemInformationBlockType2 field descriptions
Index of the PLMN across the plmn-IdentityList fields included in SIB1. Value 1 indicates the PLMN listed 1st in the 1st plmn-IdentityList included in SIB1. Value 2 indicates the PLMN listed 2nd in the same plmn-IdentityList, or when no more PLMN are present within the same plmn-IdentityList, then the PLMN listed 1st in the subsequent plmn-IdentityList within the same SIBI and so on. NOTE 1.
plmn-InfoList
If E-UTRAN includes this field, it includes the same number of entries, and listed in the same order as PLMNs across the plmn-IdentityList fields included in SIB1. That is, the first entry corresponds to the first entry of the combined list that results from concatenating the entries included in the second to the original plmn-IdentityList field.
reducedCP-Latency Enabled
If present, reduced control plane latency is enabled. UEs supporting reduced CP latency transmit Msg3 according to $k_1 \geq 5$ timing as specified in TS 36.213 [23] when transmitting RRCConnectionResume Request in Msg3.
ssac-BarringForMMTEL-Video
Service specific access class barring for MMTEL video originating calls.
ssac-BarringForMMTEL-Voice
Service specific access class barring for MMTEL voice originating calls.
udt-Restricting
Value TRUE indicates that the UE should indicate to the higher layers to restrict unattended data traffic TS 22.101 [77] irrespective of the UE being in RRC_IDLE or RRC_CONNECTED. The UE shall not indicate to the higher layers if the UE has one or more Access Classes, as stored on the USIM, with a value in the range 11 . . . 15, which is valid for the UE to use according to TS 22.011 [10] and TS 23.122 [11].
udt-RestrictingTime
If present and when the udt-Restricting changes from TRUE, the UE runs a timer for a period equal to rand * udt-RestrictingTime, where rand is a random number drawn that is uniformly distributed in the range $0 \leq rand < 1$ value in seconds. The timer stops if udt-Restricting changes to TRUE. Upon timer expiry, the UE indicates to the higher layers that the restriction is alleviated.
unicastFreqHoppingInd
This field indicates if the UE is allowed to indicate support of frequency hopping for unicast MPDCCH/PDSCH/PUSCH as described in TS 36.321 [6]. This field is included only in the BR version of SI message carrying SystemInformationBlockType2.
ul-Bandwidth
SystemInformationBlockType2 field descriptions
Parameter: transmission bandwidth configuration, $N_{RB}$, in uplink, see TS 36.101 [42, table 5.6-1]. Value n6 corresponds to 6 resource blocks, n15 to 15 resource blocks and so on. If for

TABLE 19-continued

SystemInformationBlockType2 field descriptions

FDD this parameter is absent, the uplink bandwidth is equal to the downlink bandwidth. For TDD this parameter is absent and it is equal to the downlink bandwidth. NOTE 1.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency. NOTE 1.
up-CIoT-EPS-Optimisation
This field indicates if the UE is allowed to resume the connection with User plane CIoT EPS Optimisation, see TS 24.301 [35].
up-EDT
This field indicates whether the UE is allowed to initiate UP-EDT, see 5.3.3.1b.
upperLayerIndication
Indication to be provided to upper layers.
useFullResumeID
This field indicates if the UE indicates full resume ID of 40 bits in RRCConnectionResume Request.
videoServiceCauseIndication
Indicates whether the UE is requested to use the establishment cause mo-VoiceCall for mobile originating MMTEL video calls.
voiceServiceCauseIndication
Indicates whether UE is requested to use the establishment cause mo-VoiceCall for mobile originating MMTEL voice calls.

Table 20 is an explanation of SIB2 field.

TABLE 20

| Conditional Presence | Explanation |
|---|---|
| ul-FreqMax | The field is mandatory present if ul-CarrierFreq (i.e. without suffix) is present and set to maxEARFCN. Otherwise the field is not present. |

NOTE 1: E-UTRAN sets this field to the same value for all instances of SI message that are broadcasted within the same cell.

The following Table 21 illustrates an access barring check for national roaming.

TABLE 21

5.3.3.x Access barring check for national roaming
1> if timer T302 or "Tbarring" is running:
2> consider access to the cell as barred.
1> else if SystemInformationBlockType2 includes "ac-BarringPerNationalRoaming":
2> if the selected PLMN is not of same country as the HPLMN or is not HPLMN:
3> consider access to the cell as not barred in terms of national barring check.
2> else:
3> draw a random number 'rand' uniformly distributed in the range: $0 \leq rand < 1$;
3> if 'rand' is lower than the value indicated by ac-BarringFactor included in "AC barring parameter":
4> consider access to the cell as not barred. ;
3> else:
4> consider access to the cell as barred.
1> else:
2> consider access to the cell as not barred.
1> if access to the cell is barred and both timers T302 and "Tbarring" are not running:
2> draw a random number 'rand' that is uniformly distributed in the range $0 \leq rand < 1$.
2> start timer "Tbarring" with the timer value calculated as follows, using the ac-BarringTime included in "AC barring parameter":
"Tbarring" = (0.7 + 0.6 * rand) * ac-BarringTime;

Method 3-4

The methods 3, 3-1, 3-2 and 3-3 propose a method in which, for UEs performing national roaming, a certain network discriminately provides access control to UEs subscribing to the certain network and UEs subscribing to a surrounding competitor network.

However, in the case of national roaming, there is a need to additionally distinguish a network user in which a problem occurs in an actual network, and a network user in which a problem does not occur in an actual network. For example, the following types of subscribers may be considered.

Subscriber A: subscribing to operator KA of country K
Subscriber B: subscribing to operator KB of country K
Subscriber C: subscribing to operator KC of country K
Subscriber D: subscribing to operator JD of country J In the above example, if a problem has occurred in the operator KB, the operators KA and KC accept a user subscribing to the operator KB. In this case, the following should be fulfilled:

the operator KA accepts users subscribing to the operators KB and JD, but does not accept a subscriber of the operator KC the operator KC accepts users subscribing to the operators KB and JD, but does not accept a subscriber of the operator KA.

That is, in the methods 3, 3-1, 3-2 and 3-3, the above requirements are fulfilled based on that only subscribers corresponding to disaster roaming accept roaming. However, in order for the base station to inform more clearly the UE of an allowed situation and a non-allowed situation, in the examples of the methods 3, 3-1, 3-2, 3-3, the UE additionally transmits information of a PLMN corresponding to each information.

Method 3-4-1

Any network may notify accepting roaming for a user of a specific network. In this process, the network informs the UE of an access control parameter (e.g., parameter such as ACB, SSAC, UAC, etc.) applied to the user of the specific network, and a network user corresponding to the above may apply a corresponding specific parameter, i.e., a value designated for each PLMN.

That is, the access control parameter corresponding to ACB, or the access category, or the access identity is indicated for each allowed PLMN in which national roaming is allowed, and the corresponding UE applies it according to this.

Method 4

A network may indicate, to a UE, whether it accepts national roaming users.

The network may indicate whether access control applies specifically to the national roaming users, or indicate a list of PLMNs excluded for normal services or a list of PLMNs accepting national roaming.

Preferably, in the above process, the fact that the UE performs the operation according to the present disclosure as above may be based on PLMN codes. That is, when the UE accesses a PLMN with the same MCC from among its PLMN codes, the UE notifies registering to the PLMN for a disaster reason, and does not notify otherwise. Alternatively, in addition, specific PLMNs designated to a SIM card of the UE may be modified so that the operations are performed. Alternatively, in addition, each PLMN may be modified so that the operations are performed on UEs subscribed to a specific PLMN.

The present disclosure has described based on HPLMN, but can be applied to cases other than HPLMN.

In the present disclosure, the UE may move to other surrounding network according to an indication in a wireless network of HPLMN, or the UE may move to other network when the UE cannot find a wireless network of HPLMN.

In the present disclosure, the UE and the network may use subscription information of the UE and identify codes of the network when determining national roaming, disaster roaming, or the process of the purpose equivalent to this. For example, if a mobile country code (MCC) of subscription information is 450 according to subscription information of any UE, the UE may exclude its home network. If a MCC of any network is 450, and the UE attempts to access this network, the UE may determine it as a national roaming process or a disaster roaming process.

In addition, even when the UE has equivalent home PLMN (EHPLMN) information the UE may determine similarly it. In addition, the UE may have information that which MCC is determined as home network by other configuration.

Main Embodiments of the Present Disclosure

FIG. 13 is a flow chart illustrating a method for a UE to select a network in accordance with an embodiment of the present disclosure.

As illustrated in FIG. 13, first, a UE may perform a registration to a first PLMN via a first base station, in S1301.

Next, when a disaster is applied to the first PLMN, the UE may receive, from the first base station, information related to the disaster applied to a first network, in S1303.

Next, the UE may transmit, to a second PLMN, a registration request message including information related to whether a disaster roaming service is applied to the UE, in S1305.

Next, the UE may receive, from the second PLMN, a response message to the registration request message.

FIG. 14 is a flow chart illustrating a method for a base station to register a UE to a network in accordance with an embodiment of the present disclosure.

As illustrated in FIG. 14, first, a base station may perform registering a UE to a first PLMN, in S1401.

Next, when a disaster occurs in the first PLMN, the base station may transmit, to the UE, information related to the disaster applied to the first PLMN, in S1403.

The information related to the disaster may include an indicator that allows the UE to select other PLMN.

Overview of Device to which the Present Disclosure is Applicable

FIG. 15 illustrates a block diagram of configuration of a communication device according to an embodiment of the present disclosure.

Referring to FIG. 15, a wireless communication system includes a network node 1510 and a plurality of UEs 1520.

The network node 1510 includes a processor 1511, a memory 1512, and a communication module (or transceiver) 1513. The processor 1511 may implement functions, processes, and/or methods described above with reference to FIGS. 1 to 14. Layers of wired/wireless interface protocol may be implemented by the processor 1511.

The memory 1512 is connected to the processor 1511 and stores various types of information for driving the processor 1511. The communication module 1513 is connected to the processor 1511 and transmits and/or receives wired/wireless signals. Examples of the network node 1510 may include a base station, AMF, SMF, UDF, or the like. In particular, if the network node 1510 is the base station, the communication module 1513 may include a radio frequency (RF) unit for transmitting/receiving a radio signal.

The UE 1520 includes a processor 1521, a memory 1522, and a communication module (or RF unit) (or transceiver) 1523. The processor 1521 may implement functions, processes and/or methods described above with reference to FIGS. 1 to 14. Layers of a radio interface protocol may be implemented by the processor 1521. In particular, the processor 1521 may include the NAS layer and the AS layer. The memory 1522 is connected to the processor 1521 and stores various types of information for driving the processor 1521. The communication module 1523 is connected to the processor 1521 and transmits and/or receives a radio signal.

The memories 1512 and 1522 may be inside or outside the processors 1511 and 1521 and may be connected to the processors 1511 and 1521 through various well-known means. Further, the network node 1510 (in case of the base station) and/or the UE 1520 may have a single antenna or multiple antennas.

FIG. 16 illustrates a block diagram of configuration of a communication device according to an embodiment of the present disclosure.

In particular, FIG. 16 illustrates in more detail the UE illustrated in FIG. 15. The communication module illustrated in FIG. 15 includes an RF module (or RF unit) illustrated in FIG. 16. The processor illustrated in FIG. 15 corresponds to a processor (or a digital signal processor (DSP) 1610) in FIG. 16. The memory illustrated in FIG. 15 corresponds to a memory 1630 illustrated in FIG. 16.

Referring to FIG. 16, the UE may include a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which is optional), a speaker 1645, and a microphone 1650. The UE may also include a single antenna or multiple antennas.

The processor 1610 implements functions, processes, and/or methods described above. Layers of a radio interface protocol may be implemented by the processor 1610.

The memory 1630 is connected to the processor 1610 and stores information related to operations of the processor 1610. The memory 1630 may be inside or outside the processor 1610 and may be connected to the processors 1610 through various well-known means.

A user inputs instructional information, such as a telephone number, for example, by pushing (or touching) buttons of the keypad 1620 or by voice activation using the microphone 1650. The processor 1610 receives and processes the instructional information to perform an appropriate function, such as to dial the telephone number. Operational data may be extracted from the SIM card 1625 or the memory 1630. Further, the processor 1610 may display instructional information or operational information on the display 1615 for the user's reference and convenience.

The RF module 1635 is connected to the processor 1610 and transmits and/or receives an RF signal. The processor 1610 forwards instructional information to the RF module 1635 in order to initiate communication, for example, transmit a radio signal configuring voice communication data. The RF module 1635 includes a receiver and a transmitter to receive and transmit the radio signal. The antenna 1640 functions to transmit and receive the radio signal. Upon reception of the radio signal, the RF module 1635 may send a signal to be processed by the processor 1610 and convert the signal into a baseband. The processed signal may be converted into audible or readable information output via the speaker 1645.

FIG. 17 illustrates an example of a structure of a radio interface protocol in a control plane between a UE and eNodeB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based on three lower layers of an open system interconnection (OSI) standard model that is well known in the art of communication systems.

The layers of the radio protocol in the control plane illustrated in FIG. 17 are described below.

The physical layer, the first layer, provides an information transfer service using a physical channel. The physical layer is connected to a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. One subframe consists of a plurality of symbols and a plurality of subcarriers on the time axis. One subframe consists of a plurality of resource blocks, and one resource block consists of a plurality of symbols and a plurality of subcarriers. A unit time, a transmission time interval (TTI), at which data is transmitted, is 1 ms corresponding to one subframe.

Physical channels existing in the physical layers of the transmission side and the reception side may be divided into, according to 3GPP LTE, a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels.

The PCFICH transmitted on a first OFDM symbol of a subframe carries a control format indicator (CFI) regarding the number of OFDM symbols used for transmission of control channels in the subframe (i.e., size of a control region). A wireless device first receives the CFI on the PCFICH and then monitors the PDCCH.

Unlike the PDCCH, the PCFICH is transmitted via a fixed PCFICH resource of the subframe without the use of blind decoding.

The PHICH carries positive acknowledgement (ACK)/ negative acknowledgement (NACK) signal for uplink (UL) hybrid automatic repeat request (HARQ). The ACK/NACK signal for UL data on PUSCH transmitted by the wireless device is transmitted on the PHICH.

A physical broadcast channel (PBCH) is transmitted on first four OFDM symbols of a second slot of a first subframe of a radio frame. The PBCH carries system information essential for the wireless device to communicate with the base station, and system information transmitted on the PBCH is referred to as a master information block (MIB).

Compared to this, system information transmitted on the PDSCH indicated by the PDCCH is referred to as a system information block (SIB).

The PDCCH may carry resource allocation and transport format of a downlink shared channel (DL-SCH), resource allocation information of an uplink shared channel (UL-SCH), paging information on a paging channel (PCH), system information on DL-SCH, resource allocation of an upper layer control message such as a random access response transmitted on PDSCH, a set of Tx power control commands on individual UEs within an arbitrary UE group, a Tx power control command, activation of a voice over internet protocol (VoIP), etc. A plurality of PDCCHs can be transmitted within a control region, and the UE can monitor the plurality of PDCCHs. The PDCCH is transmitted on aggregation of one or multiple consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined depending on a correlation between the number of CCEs and the coding rate provided by the CCEs.

Control information transmitted on PDCCH is referred to as downlink control information (DCI). The DCI may contain resource allocation of PDSCH (which is also referred to as DL grant), resource allocation of PUSCH (which is also referred to as UL grant), a set of Tx power control commands on individual UEs within an arbitrary UE group, and/or activation of a voice over internet protocol (VoIP).

There are several layers in the second layer. First, a medium access control (MAC) layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane, according to a type of transmitted information.

The radio link control (RLC) layer of the second layer segments and concatenate data received from the upper layer and adjusts a data size so that a lower layer is adapted to transmit data to a radio section. In order to guarantee various QoS required by each radio bearer (RB), the RLC layer provides three operation modes of a transparent mode (TM), an unacknowledged mode (UM) (non-response mode), and an acknowledged mode (AM) (or response mode). In particular, the AM RLC performs a retransmission function through an automatic repeat and request (ARQ) function for reliable data transmission.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. This allows only information, that is necessarily required in a header part of data, to be transmitted, thereby increasing transmission efficiency of the radio section. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. Examples of the cases may include a case where transmission of uplink data is necessary for a reason of an attempt of a user to make a phone call, etc., or transmission of a response message when receiving a paging signal from the E-UTRAN.

A non-access stratum (NAS) layer performs functions such as session management and mobility management.

The NAS layer illustrated in FIG. 17 is described in detail below.

The NAS layer is divided into a NAS entity for mobility management (MM) and a NAS entity for session management (SM).

1) The NAS entity for MM generally provides the following functions.

An NAS procedure related to the AMF includes the following.

Registration management and connection management procedure. The AMF supports the functions.

Secure NAS signal connection between the UE and the AMF (integrity protection, ciphering)

2) The NAS entity for SM performs session management between the UE and the SMF.

A SM signalling message is generated and processed in the UE and the NAS-SM layer of the SMF. The content of the SM signalling message is not interpreted by the AMF.

In case of SM signalling transmission,

The NAS entity for MM generates security header indicating NAS transmission of SM signalling, and a NAS-MM message deriving a method and location of sending the SM signalling message via additional information for the received NAS-MM.

Upon reception of SM signalling, the NAS entity for SM performs integrity check of the NAS-MM message, and derives a method and place of deriving the SM signalling message by interpreting additional information.

In FIG. 17, the RRC layer, the RLC layer, the MAC layer, and the PHY layer located below the NAS layer are collectively referred to as access stratum (AS) layer.

Application Range of the Present Disclosure

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

Mobile terminals disclosed in the present disclosure may include cellular phones, smart phones, laptop computers, digital broadcast terminals, personal digital assistants (PDAs), portable multimedia players (PMPs), navigators, slate PCs, tablet PCs, ultra-books, wearable devices (e.g., smart watches, smart glasses, head mounted displays (HMDs)), and the like. Furthermore, the mobile terminals may be used for controlling at least one device in an Internet of Things (IoT) environment or a smart greenhouse.

By way of non-limiting example only, further description will be made with reference to particular types of mobile terminals. However, such teachings may be equally applied to other types of mobile terminals, such as those types noted above. In addition, it can be readily apparent to those skilled in the art that these teachings can also be applied to stationary terminals such as digital TV, desktop computers, digital signage, and the like.

Hereinafter, embodiments related to a control method which can be implemented by the mobile terminal configured as above were described with reference to the accompanying drawings. It is apparent to those skilled in the art that various modifications can be made to within the range without departing from the spirit and essential features of the present invention.

The embodiments of the present disclosure described above can be implemented by various means. For example, embodiments of the present disclosure can be implemented by hardware, firmware, software, or combinations thereof.

When embodiments are implemented by hardware, a method according to embodiments of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, a method according to embodiments of the present disclosure can be implemented by devices, procedures, functions, etc. performing functions or operations described above. Software code can be stored in a memory unit and can be executed by a processor. The memory unit is provided inside or outside the processor and can exchange data with the processor by various well-known means.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, and an optical data storage device, other types of storage mediums presented herein, etc. If desired, the computer-readable medium may be implemented in the form of a carrier wave (e.g., transmission over Internet). The computer may include the processor of the terminal. Accordingly, the detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

The communication method described above can be applied to various wireless communication systems including IEEE 802.16x and 802.11x systems, in addition to the 3GPP system. Furthermore, the proposed method can be applied to the mmWave communication system using ultra-high frequency bands.

The invention claimed is:

1. A method performed by a user equipment (UE) in a wireless communication system, the method comprising:
    selecting a public land mobile network (PLMN), based on at least one allowable PLMN which is not in a list of forbidden PLMNs;

determining whether an access to the PLMN is allowed based on an access identity related to an access control;

based on that the access to the PLMN is determined to be allowed, transmitting, to the PLMN, a registration request message; and receiving, from the PLMN, a response message for the registration request message, wherein, based on that there is no available PLMN except for at least one PLMN in the list of forbidden PLMNs and based on that the at least one PLMN in the list of forbidden PLMNs is related to a disaster roaming:

the PLMN is selected based on the at least one PLMN in the list of forbidden PLMNs, and wherein determining whether the access to the PLMN, which is selected based on the at least one PLMN related to the disaster roaming in the list of forbidden PLMNs, is allowed based on the access identity comprises:

among a plurality of access identity numbers related to UE configuration, selecting the access identity equal to an access identity number related to the disaster roaming; and determining, based on the access identity number related to the disaster roaming, whether the access to the PLMN is allowed.

2. The method of claim 1, wherein, based on the access to the PLMN not being allowed, the determining whether the access to the PLMN is allowed is performed again, after pre-configured time.

3. The method of claim 1, further comprising:
receiving a system information block including information for PLMNs related to the disaster roaming.

4. A user equipment (UE) operating in a wireless communication system, the UE comprising:

an RF module configured to transmit and receive a radio signal;

at least one processor functionally connected to the RF module; and at least one computer memory operationally connected to the at least one processor and storing instructions, when executed by the at least one processor, which configure the at least one processor to perform operations: comprising:

selecting a public land mobile network (PLMN), based on at least one allowable PLMN which is not in a list of forbidden PLMNs;

determining whether an access to the PLMN is allowed based on an access identity related to an access control; and based on that the access to the PLMN is determined to be allowed, transmitting, to the PLMN, a registration request message; and receiving, from the PLMN, a response message for the registration request message, wherein, based on that there is no available PLMN except for at least one PLMN in the list of forbidden PLMNs and based on that the at least one PLMN in the list of forbidden PLMNs is related to a disaster roaming:

the PLMN is selected based on the at least one PLMN in the list of forbidden PLMNs, and wherein determining whether the access to the PLMN, which is selected based on the at least one PLMN related to the disaster roaming in the list of forbidden PLMNs, is allowed based on the access identity comprises:

among a plurality of access identity numbers related to UE configuration, selecting the access identity equal to an access identity number related to the disaster roaming; and determining, based on the access identity number related to the disaster roaming, whether the access to the PLMN is allowed.

5. The UE of claim 4, wherein, based on the access to the PLMN not being allowed, the determining whether the access to the PLMN is allowed is performed again, after pre-configured time.

6. The UE of claim 4, further comprising:
receiving a system information block including information for PLMNs related to the disaster roaming.

* * * * *